United States Patent
Lavoie et al.

(10) Patent No.: US 9,824,053 B2
(45) Date of Patent: Nov. 21, 2017

(54) STANDARDIZED HOT-PLUGGABLE TRANSCEIVING UNIT WITH CONTROL PLANE FUNCTIONALITIES

(71) Applicant: Embrionix Design inc., Laval (CA)

(72) Inventors: Renaud Lavoie, Laval (CA); Eric Dudemaine, Crabtree (CA)

(73) Assignee: EMBRIONIX DESIGN INC, Laval (CA)

( * ) Notice: Subject to any disclaimer, the term of this patent is extended or adjusted under 35 U.S.C. 154(b) by 224 days.

(21) Appl. No.: 14/851,113

(22) Filed: Sep. 11, 2015

(65) Prior Publication Data

US 2017/0075849 A1    Mar. 16, 2017

(51) Int. Cl.
| | |
|---|---|
| *H04B 10/40* | (2013.01) |
| *G06F 13/40* | (2006.01) |
| *G02B 6/42* | (2006.01) |
| *H04B 1/3827* | (2015.01) |

(52) U.S. Cl.
CPC ....... *G06F 13/4081* (2013.01); *G02B 6/4278* (2013.01); *H04B 1/3833* (2013.01); *H04B 10/40* (2013.01)

(58) Field of Classification Search
CPC .. H04B 10/40; H04B 10/503; H04B 10/2581; H04B 10/07; H04B 1/3833; G06F 13/4081; G02B 6/4278
See application file for complete search history.

(56) References Cited

U.S. PATENT DOCUMENTS

| | | | | |
|---|---|---|---|---|
| 2003/0128411 | A1* | 7/2003 | Aronson | G01M 11/00 398/139 |
| 2007/0153823 | A1* | 7/2007 | Wojtowicz | H04B 10/40 370/463 |
| 2012/0182900 | A1* | 7/2012 | Davari | H04L 12/10 370/254 |
| 2015/0086211 | A1* | 3/2015 | Coffey | H04B 10/40 398/116 |
| 2015/0135209 | A1* | 5/2015 | LaBosco | H04N 21/43635 725/31 |

* cited by examiner

*Primary Examiner* — Ernest Unelus
(74) *Attorney, Agent, or Firm* — IP Delta Plus Inc.

(57) ABSTRACT

A standardized hot-pluggable transceiving unit comprising a housing, a connector and a processing unit. The housing has specific standardized dimensions and can be inserted into a chassis of a hosting unit. The connector receives an IP flow. The processing unit processes packets of the IP flow based on a control plane message. The control plane message is received by the connector receiving the IP flow or by another connector of the transceiving unit. The processing unit may further generate a report or an alarm related to the IP flow, for transmission by the transceiving unit. The IP flow may for example transport a video payload. A system comprising a chassis and the transceiving unit is also disclosed. The chassis comprises a processing unit capable of processing packets of IP flows. The transceiving unit is inserted into the chassis and exchanges data with the processing unit of the chassis.

19 Claims, 17 Drawing Sheets

| Source IP address | Destination IP address | Action |
|---|---|---|
| XXXX | YYYY | Allow |
| | ZZZZ | Drop |
| AAAA | BBBB | Change destination IP address to CCCC |

Figure 13

STANDARDIZED HOT-PLUGGABLE TRANSCEIVING UNIT WITH CONTROL PLANE FUNCTIONALITIES

TECHNICAL FIELD

The present disclosure relates to the field of standardized hot-pluggable transceiving units. More specifically, the present disclosure relates to a standardized hot-pluggable transceiving unit with control plane management functionalities.

BACKGROUND

Small Form-factor Pluggable (SFP) units represent one example of standardized hot-pluggable transceiving units. SFP units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, RJ45 connectors and various other types of electrical connectors. In general, an SFP unit allows connection between an external apparatus, via a front connector of one of the aforementioned types, and internal components of a hosting unit, for example a motherboard, a card or a backplane leading to further components, via a back interface of the SFP unit. Specification no INF-8074i Rev 1.0, entitled "SFP (Small Form-factor Pluggable) Transceiver, dated May 12, 2001, available at ftp://ftp.seagate.com/sff/INF-8074.PDF, generally describes sizes, mechanical interfaces, electrical interfaces and identification of SFP units.

The SFF Committee also produced specification no SFF-8431 Rev. 4.1, "Enhanced Small Form-factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a hosting unit, the hosting unit in turn exchanging signals with external apparatuses via SFP devices.

Recently, SFP units with internal features and functions providing signal processing capabilities have appeared. For instance, some SFP units now include signal re-clocking, signal reshaping or reconditioning, signals combination or separation, etc.

In the field of video transport, advances have been made recently for transporting the payload of a video signal into Internet Protocol (IP) packets (e.g. Serial Digital Interface (SDI) video payload encapsulated into IP packets). A SFP unit can be adapted to receive the IP flow transporting the video payload, and to transmit this IP flow to a hosting unit into which the SFP unit is currently inserted. The IP flow transporting the video payload is generally referred to as the data plane. Control plane messages are exchanged between various entities (e.g. servers, routers, switches, gateways, etc.) for controlling characteristics of the IP flow. Upon reception of such a control plane message, one of these entities is capable of modifying characteristics of the IP flow, in conformance with the received control plane message. However, SFP units currently lack this type of capability.

Therefore, there is a need for a new standardized hot-pluggable transceiving unit with control plane management capabilities.

SUMMARY

According to a first aspect, the present disclosure provides a standardized hot-pluggable transceiving unit comprising a housing, a connector and a processing unit. The housing has specific standardized dimensions and is adapted to being inserted into a chassis of a hosting unit. The connector is for receiving an Internet Protocol (IP) flow. The processing unit is for processing at least one packet of the received IP flow based on a control plane message. The control plane message is received by one of the following: the connector receiving the IP flow or another connector of the transceiving unit.

According to a second aspect, the present disclosure provides a system comprising a chassis and the previously described standardized hot-pluggable transceiving unit. The chassis is adapted for receiving at least one standardized hot-pluggable transceiving unit, and the chassis comprises at least one processing unit capable of processing packets of an IP flow. The previously described transceiving unit is inserted into the chassis, and comprises a rear interface on a back panel of its housing for exchanging data with the processing unit of the chassis.

BRIEF DESCRIPTION OF THE DRAWINGS

Embodiments of the disclosure will be described by way of example only with reference to the accompanying drawings, in which:

FIG. 13 illustrates an example of an action table memorized by the SFP units of FIG. 11 or 12.

DETAILED DESCRIPTION

Figure 1:
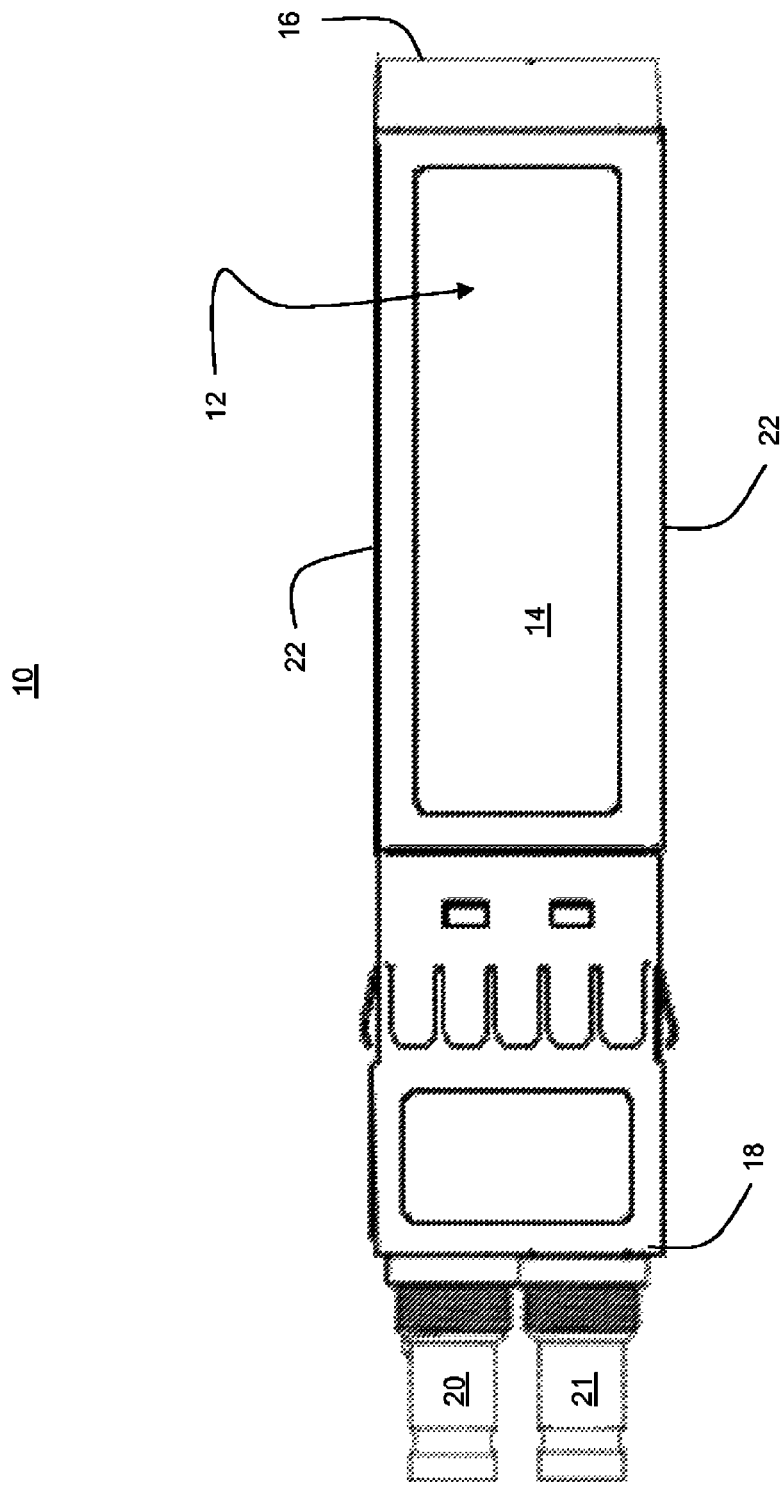
FIG. 1 is a top view of an SFP unit.
Figure 2:
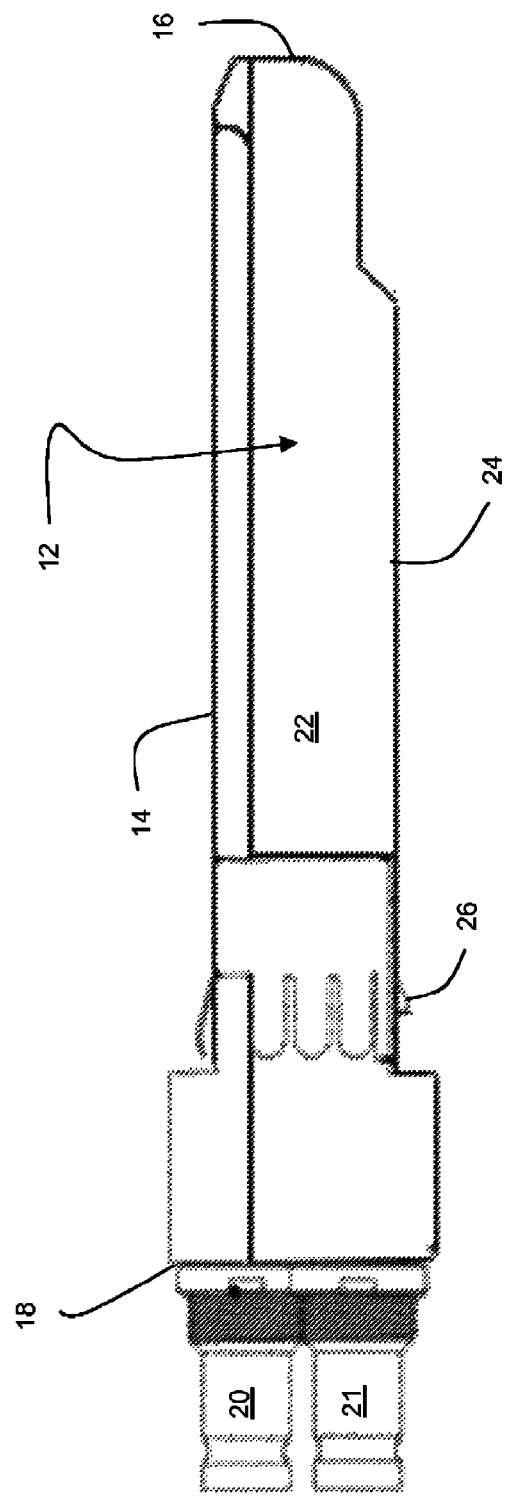
FIG. 2 is a side elevation view of the SFP unit of FIG. 1.
Figure 4:
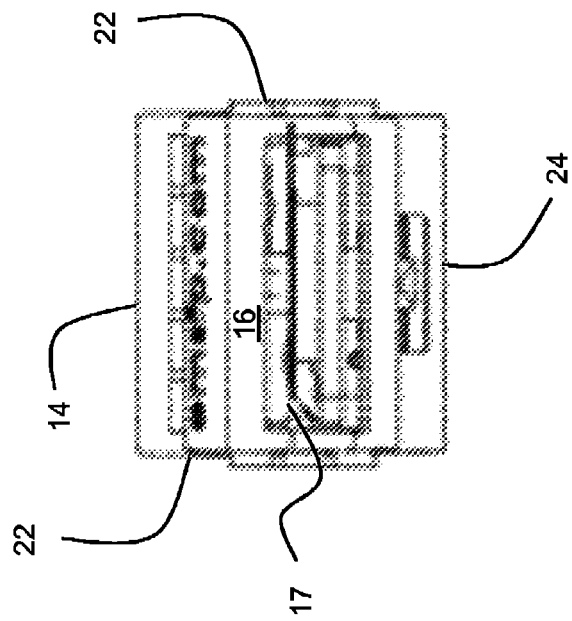
FIG. 4 is back elevation view of the SFP unit of FIG. 1.
Figure 3:
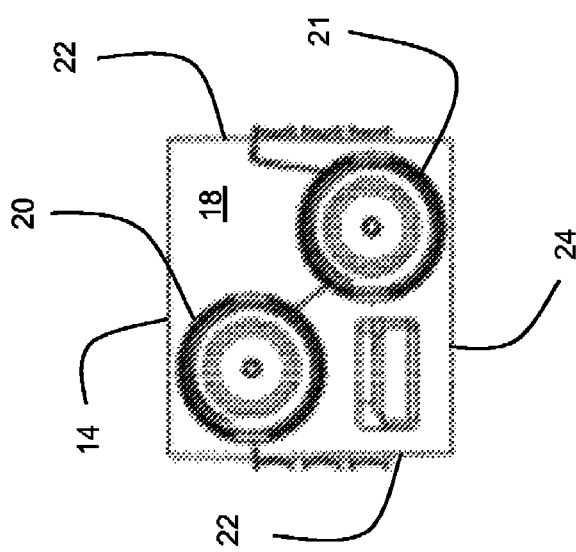
FIG. 3 is a front elevation view of the SFP unit of FIG. 1.
Figure 5:
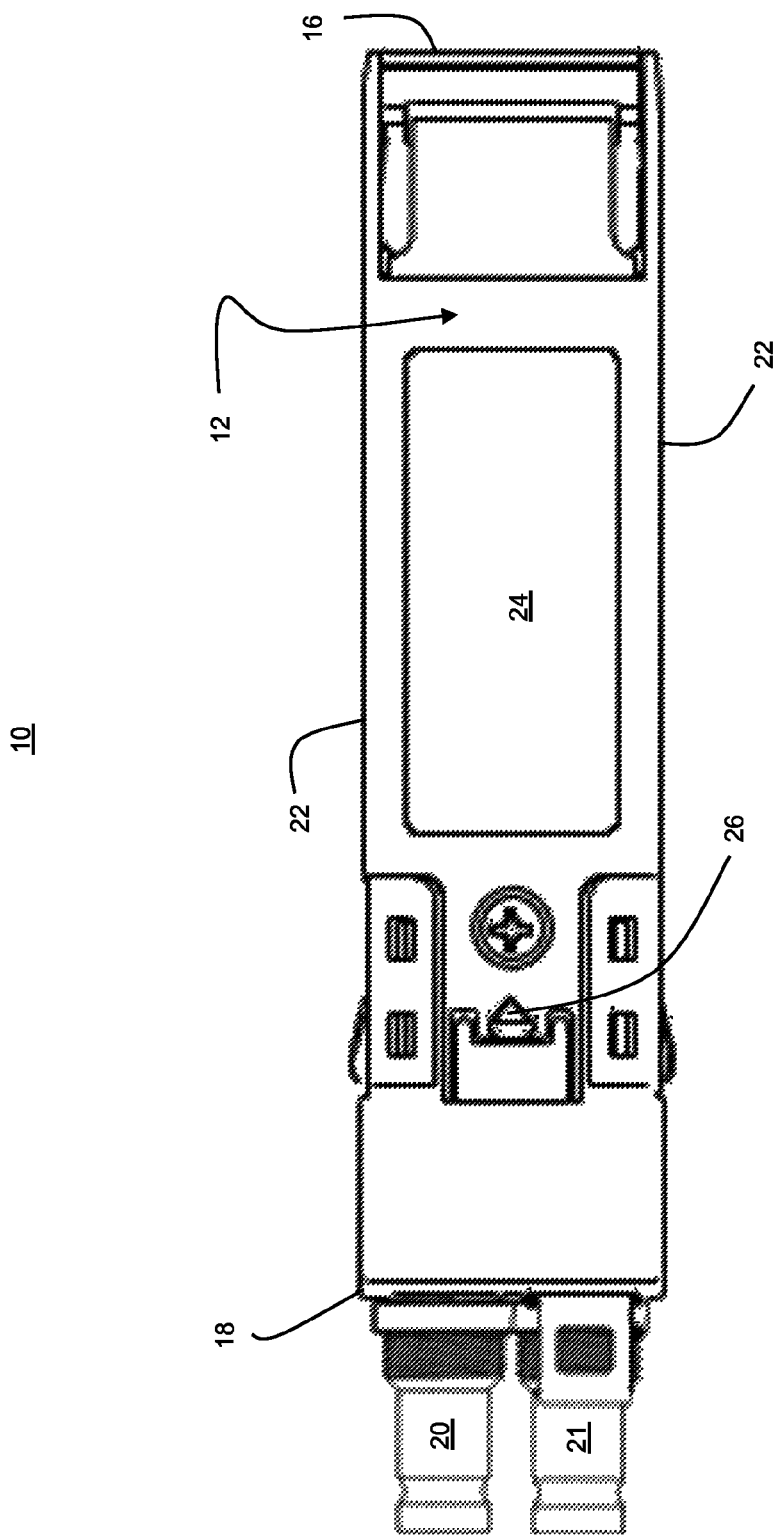
FIG. 5 is a bottom view of the SFP unit of FIG. 1.
Figure 6:
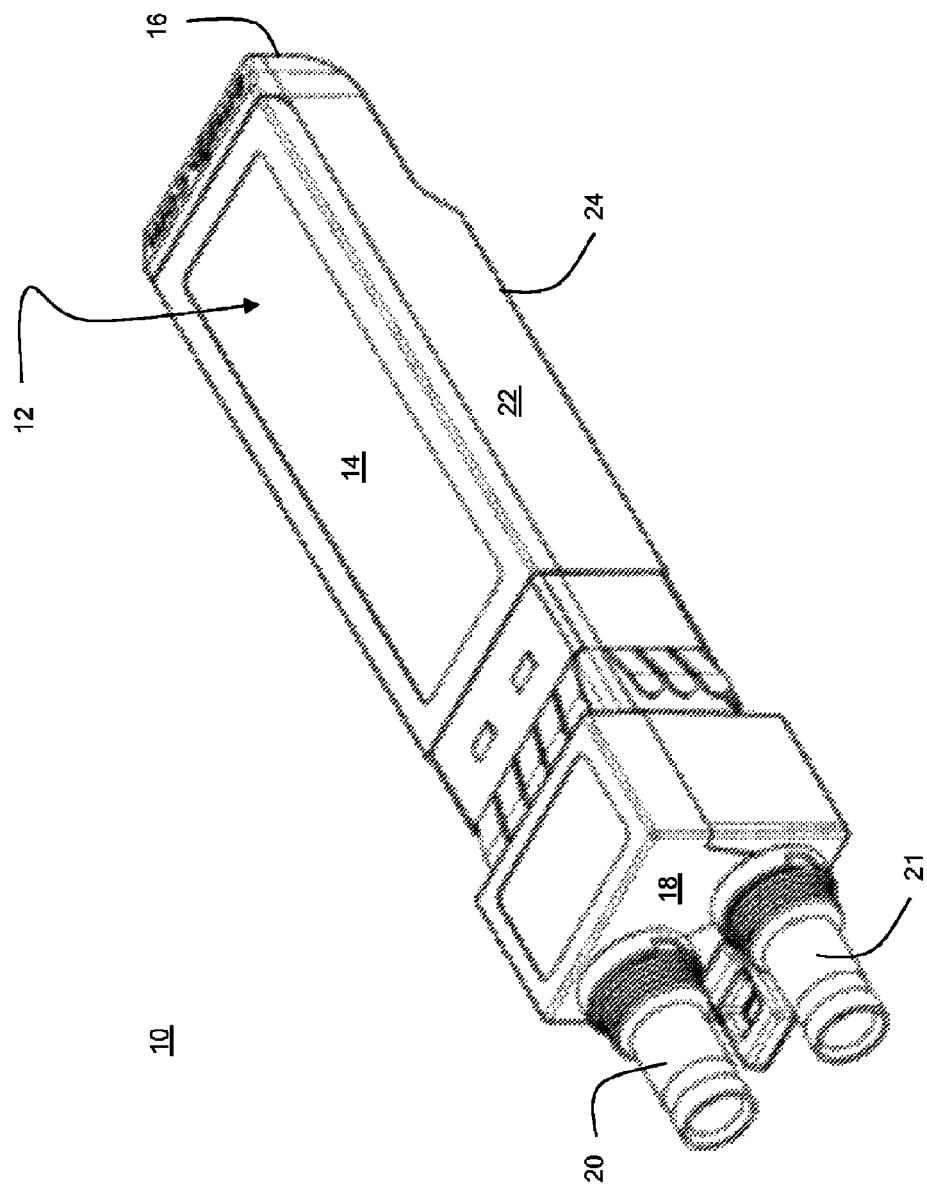
FIG. 6 is a perspective view of the SFP unit of FIG. 1.

The foregoing and other features will become more apparent upon reading of the following non-restrictive description of illustrative embodiments thereof, given by way of example only with reference to the accompanying drawings.

The present disclosure describes standardized hot-pluggable transceiving units, such as Small Form-factor Pluggable (SFP)/SFP+ units, having internal features that far exceed those of conventional units. While conventional units merely provide connection capabilities between a hosting unit in which they are inserted and external apparatuses, the standardized hot-pluggable transceiving unit disclosed herein provides the capability of performing control plane management of an IP flow, for instance an IP flow transporting a video payload.

The following terminology is used throughout the present disclosure:

SFP: Small Form-factor Pluggable, this term refers to units that are insertable into a chassis of a hosting unit; in the present disclosure, an SFP unit complies with an industry standard specification.

Connector: A device component for physically joining circuits carrying electrical, optical, radio-frequency, or like signals.

Video signal: Analog or digital signal usable for display purposes, either directly on a monitor, or through multicast or broadcast.

SDI: Serial Digital Interface, a family of digital video interfaces using one or more coaxial cables with Bayonet Neill-Concelman (BNC) connectors.

SMPTE: A family of digital video transmission standards published by the Society of Motion Picture and Television Engineers (SMPTE).

In the rest of the disclosure, an SFP unit is used to illustrate an example of a standardized hot-pluggable transceiving unit. However, the teachings of the present disclosure are not limited to an SFP unit, and can be applied to any type of standardized hot-pluggable transceiving unit.

The SFP unit comprises a housing having a front panel, a back panel, a top, a bottom and two sides. The front panel includes at least one connector for connecting a cable, a fiber, twisted pairs, etc. The back panel includes at least one connector for connecting to a hosting unit. The SFP unit may be fully-compliant or partially compliant with standardized SFP dimensions, such as SFP, SFP+, XFP (SFP with 10 Gigabit/s data rate), Xenpak, QSFP (Quad (4-channel) SFP with 4×10 Gigabit/s data rate), QSFP+, CFP (C form-factor pluggable with 100 Gigabit/s data rate), CPAK or any other standardized Small Form-factor Pluggable unit. Consequently, in the context of the present disclosure, an SFP unit may correspond to SFP, SFP+, XFP, Xenpak, QSFP, QSFP+, CFP, CPAK, or any other known standards related to Small Form-factor Pluggable units.

Reference is now made concurrently to FIGS. 1-6, which are, respectively, a top view, a side elevation view, a front elevation view, a back elevation view, a bottom view and a perspective view of an SFP unit 10. The SFP unit 10 comprises a housing 12. The housing defines a top 14, a bottom 24, and two sides 22. The housing 12 may be at least partially of dimensions in compliance with at least one of the following standards: SFP, SFP+, XFP, Xenpak, QSFP, QSFP+, CFP, CPAK, etc. Alternatively, the housing 12 has functional dimensions based on at least one of the following standards: SFP, SFP+, XFP, Xenpak, QSFP, QSFP+, CFP, CPAK, etc.

The SFP unit 10 further comprises a back panel 16 affixed to the housing 12. The back panel 16 may comprise a rear interface 17, for instance an electrical or an optical interface. In an example, the back panel comprises the rear interface 17 (also named a host connector) suitable to connect the SFP unit 10 to a backplane of a chassis (not shown for clarity purposes), as known to those skilled in the art.

The SFP unit 10 further comprises a front panel 18 affixed to the housing 12. The front panel 18 may comprise one or more connectors, for example a connector 20 of a co-axial cable type such as SDI, adapted to send and/or receive a digital video signal and a connector 21, also of the co-axial cable type, adapted to send and/or receive a digital data signal. The SFP unit 10 may further comprise an engagement mechanism, such as for example a latch 26 as shown in a resting position on the bottom 24 in FIG. 2, for maintaining the SFP unit 10 in place within a chassis.

Referring now concurrently to FIGS. 7A, 7B, 7C and 7D, a legacy IP based video distribution system for generating, forwarding and delivering IP flows transporting a video payload is represented. In the rest of the description, an IP flow transporting a video payload is referred to as a video IP flow.

Figure 7A:
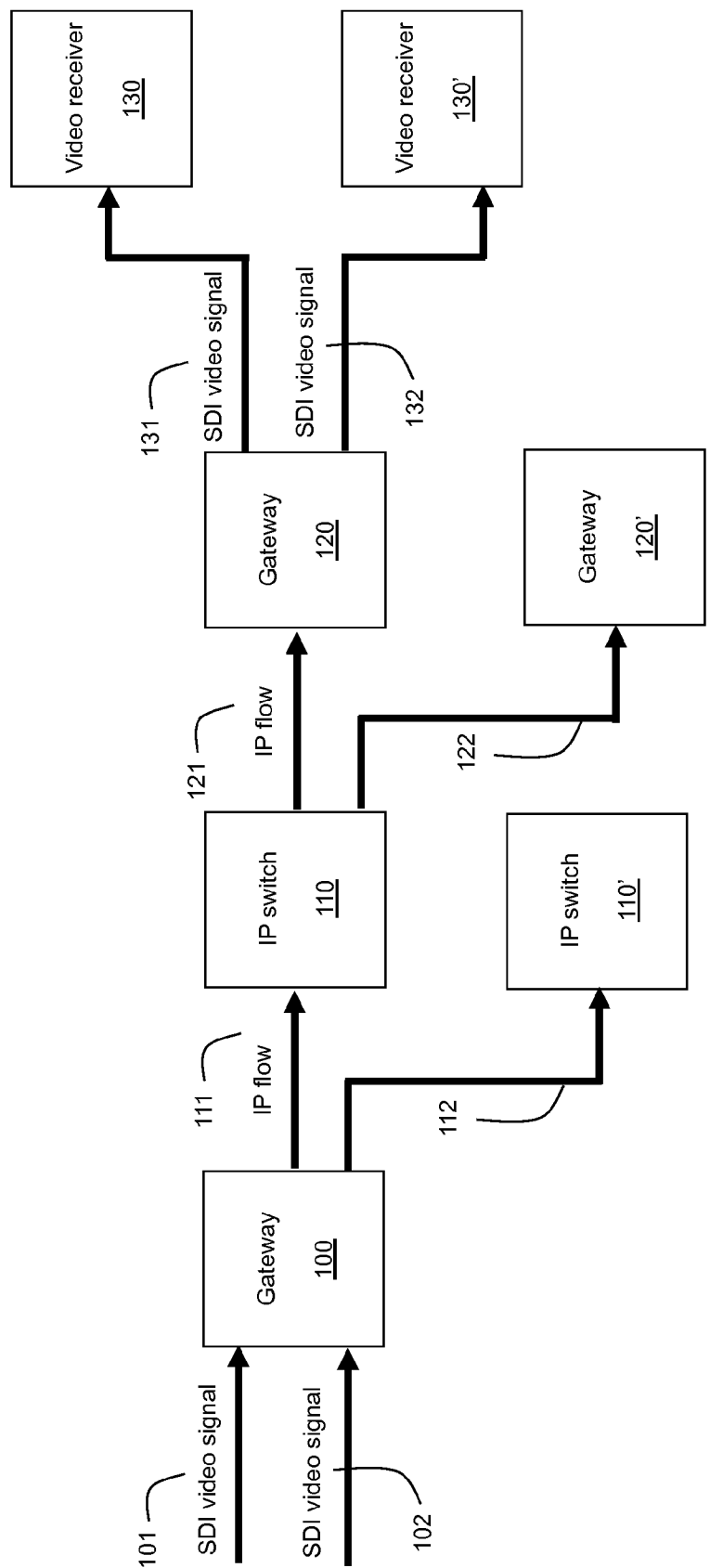
FIGS. 7A to 7D represent a legacy IP based video distribution system for generating, forwarding and delivering IP flows transporting a video payload, according to the prior art.

Referring more particularly to FIG. 7A, a gateway 100 receives one or more video signals, and converts the one or more video signals into one or more IP flows transporting video payloads extracted from the received video signals. For illustration purposes, two independent SDI video signals 101 and 102 are received by the gateway 100, and converted into corresponding IP flow 111. However, other types of video signals (e.g. High-Definition Multimedia Interface (HDMI) video signals, etc.) can be received by the gateway 100, and converted into corresponding IP flow. The video signals (e.g. 101 and 102) received by the gateway 100 comprise a video payload, but may also comprise an audio payload and/or a metadata payload (e.g. closed caption text, subtitle text, rating text, a time code (e.g. for indicating a time interval before a program goes live), a Vertical Blanking Interval (VBI), V-chip rating, etc.). Similarly, the IP flow (e.g. 111) generated by the gateway 100 comprise corresponding video payloads, but may also comprise corresponding audio payloads and/or corresponding metadata payloads. The video signals (e.g. 101 and 102) received by the gateway 100 are generated by one or more video sources 150 represented in FIG. 7D, as is well known in the art.

Each received independent video signal (e.g. 101 and 102) is converted by the gateway 100 into a corresponding independent video IP flow 111. Alternatively, several video signals received by the gateway 100 are converted and combined into a single corresponding video IP flow 111.

A video IP flow (e.g. 111) is well known in the art. It consists in a sequence of IP packets from a source (e.g. the gateway 100) to a destination (e.g. an IP switch 110). Several protocol layers are involved in the transport of the IP packets of the video IP flow (e.g. 111), including a physical layer (e.g. optical or electrical), a link layer (e.g. Media Access Control (MAC) for Ethernet), an Internet layer (e.g. IPv4 or IPv6), a transport layer (e.g. User Datagram Protocol (UDP)), and one or more application layers ultimately embedding at least one of: a video payload, an audio payload and a metadata payload. The video IP flow provides delivery of the application payload (video, audio or metadata) over an IP networking infrastructure represented in FIG. 7D.

In the present description, the term "SDI video signal" refers to a digital video signal compliant with the SDI standard. It encompasses several variants of the SDI standard, including for example SD-SDI, HD-SDI, ED-SDI, 3G-SDI, 6G-SDI, 12G-SDI, etc.; which have all been standardized by the SMPTE organization. An SDI video signal transports an SDI payload, which comprises a video payload carrying a video component of the SDI signal. The SDI payload generally also comprises at least one additional payload, such as an audio payload for carrying an audio component of the SDI signal and/or a metadata payload for carrying a metadata component of the SDI signal.

In a particular aspect, at least one of the IP flow 111 generated by the gateway 100 is a video IP flow which conforms to one of the following standards: the SMPTE 2022-5 standard, the SMPTE 2022-6 standard, and the SMPTE 2022-7 standard. These three standards can be used singly or in combination for transporting SDI payloads (e.g. a SDI video payload and a corresponding SDI audio payload) over IP. The SMPTE 2022-5 standard provides a Forward Error Correction (FEC) scheme for compensating potential IP packet losses of an IP flow transporting an SDI payload, since IP networks do not provide a guaranteed delivery of all transmitted IP packets. The SMPTE 2022-6 standard provides transport of SDI payloads via the Real-time Transport Protocol (RTP). It also provides an additional protocol layer on top of the RTP layer: the High-Bitrate Media Transport Protocol (HBRMT) protocol layer, which supports a high-precision clock and extra metadata. The SMPTE 2022-7 standard provides seamless protection switching to an IP flow transporting an SDI payload, by sending two matching streams of IP packets from a source to a destination over different paths, and have the receiver switch automatically between them.

A destination gateway (e.g. 120) is determined for each video IP flow 111 generated by the gateway 100, and the destination IP address of the IP packets of the IP flow 111 is set to an IP address of the destination gateway (e.g. 120). The IP flows are transported over the IP networking infrastructure illustrated in FIG. 7D, where source gateways (e.g. 100) generate IP flows which are transported via one or more intermediate IP switches (e.g. 110 and 110') to destination gateways (e.g. 120 and 120').

For example, the two video signals 101 and 102 converted by the gateway 100 both have the gateway 120 as destination. Each video signal 101 and 102 is converted by the gateway 100 into an IP flow 111 sent to the IP switch 110. The IP switch 110 processes the received IP flow 111 according to forwarding algorithms (as is well known in the art), and generates corresponding IP flows 121 sent to the destination gateway 120. The IP flows 111 and 121 are generally identical, but may also be slightly different (e.g. the original video IP flow 111 has no Quality of Service (QoS) characteristics, while the video IP flow 121 has been allocated a particular QoS parameter by the IP switch 110). Although not represented in FIG. 7A for simplification purposes, the IP flow 111 generated by the source gateway 100 may be forwarded by a plurality of intermediate IP switches (similar to IP switch 110) before reaching the destination gateway 120.

The destination gateway 120 converts the received IP flow 121 into corresponding video signals, which are further transferred to dedicated equipment. For instance, as illustrated in FIG. 7A, the SDI video signal 101 is transported (via the IP flows 111 and 121) to the destination gateway 120, where it is converted into a SDI video signal 131 (corresponding to the original SDI video signal 101) and outputted to a video receiver 130. Similarly, the SDI video signal 102 is transported (via the IP flows 111 and 121) to the destination gateway 120, where it is converted into a SDI video signal 132 (corresponding to the original SDI video signal 102) and outputted to a video receiver 130'. The SDI video signals 131 and 132 may also be outputted to the same video receiver (e.g. 130).

The IP switch 110 may be connected to a plurality of destination gateways. For instance, the SDI video signal 102 is transported (via the IP flows 111 and 122) to another destination gateway 120', where it is converted into a SDI video signal corresponding to the original SDI video signal 102 and outputted to another video receiver (not represented in FIG. 7A). The IP switch 110 performs the forwarding of the received IP flows 111 by generating outbound IP flows 121 and 122 respectively directed to destination gateways 120 and 120'.

The source gateway 100 may be connected to a plurality of IP switches. For instance, the SDI video signal 102 is converted into a video IP flow 112 sent to another IP switch 110' (which further forwards the video IP flow to a destination gateway not represented in FIG. 7A).

The IP switches 110 and 110' are capable of performing layer 3 and/or layer 2 forwarding of IP packets, as is well known in the art. The term IP switch is used generically, and may encompass switches, routers, etc. A router generally has more sophisticated forwarding capabilities than a switch.

The aforementioned IP flows (e.g. 111 and 121) are generally referred to as the data plane. Control plane messages are exchanged between various entities (e.g. servers, switches, gateways, etc.) for controlling characteristics of the IP flows. Upon reception of such a control plane message, one of these entities is capable of modifying characteristics of the video IP flow, in conformance with the received control plane message.

Figure 7B:
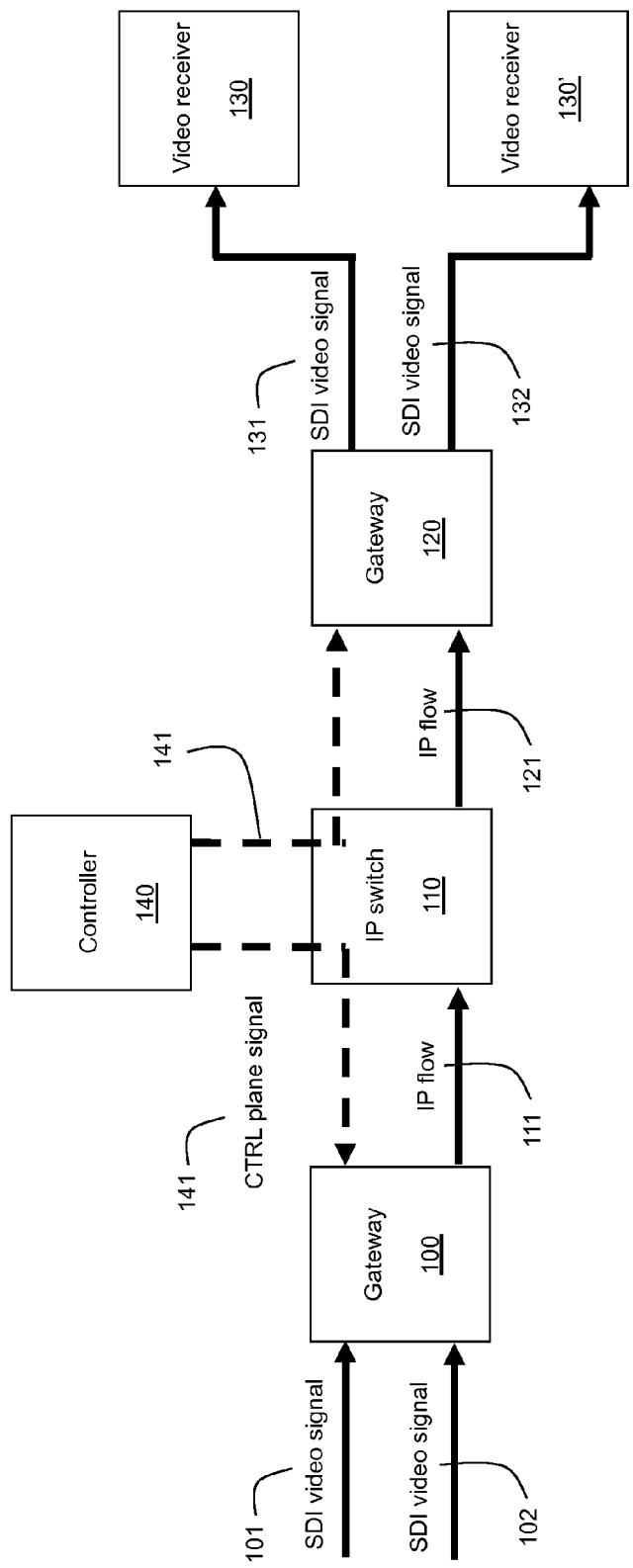
Figure 7C:
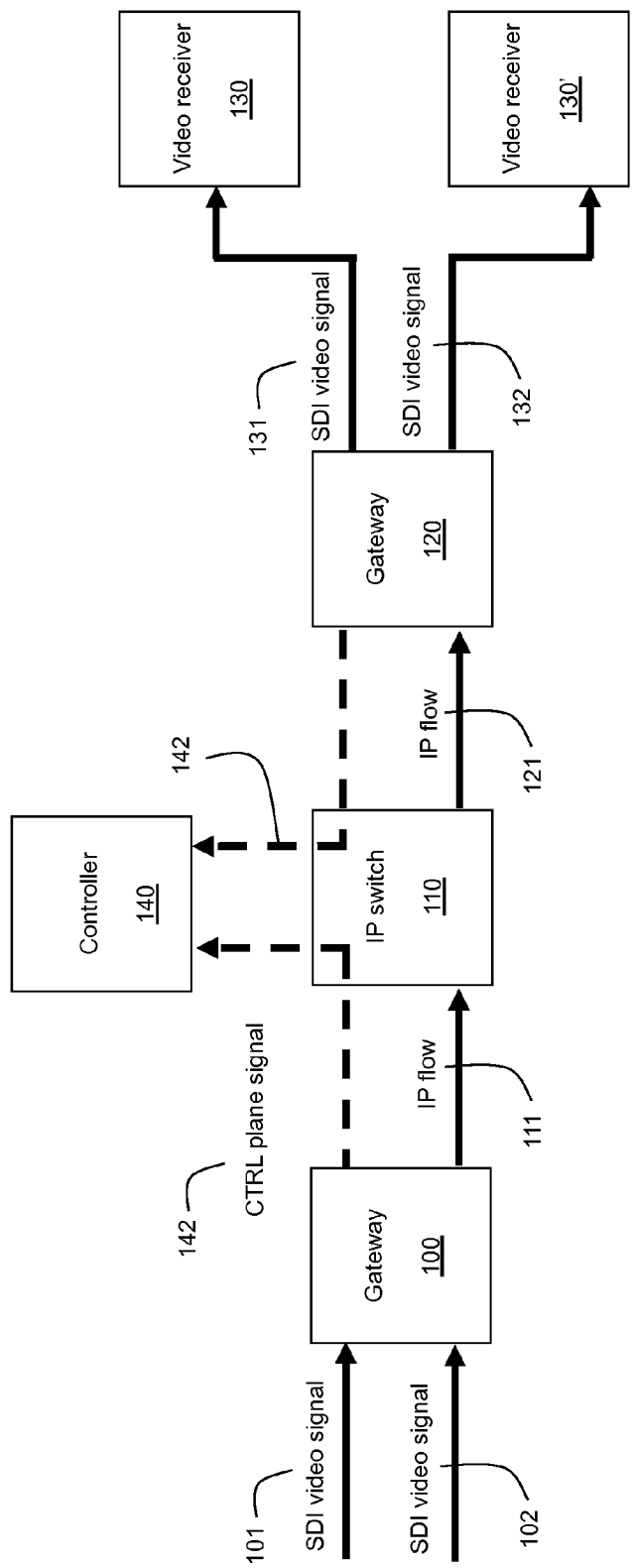
Figure 7D:
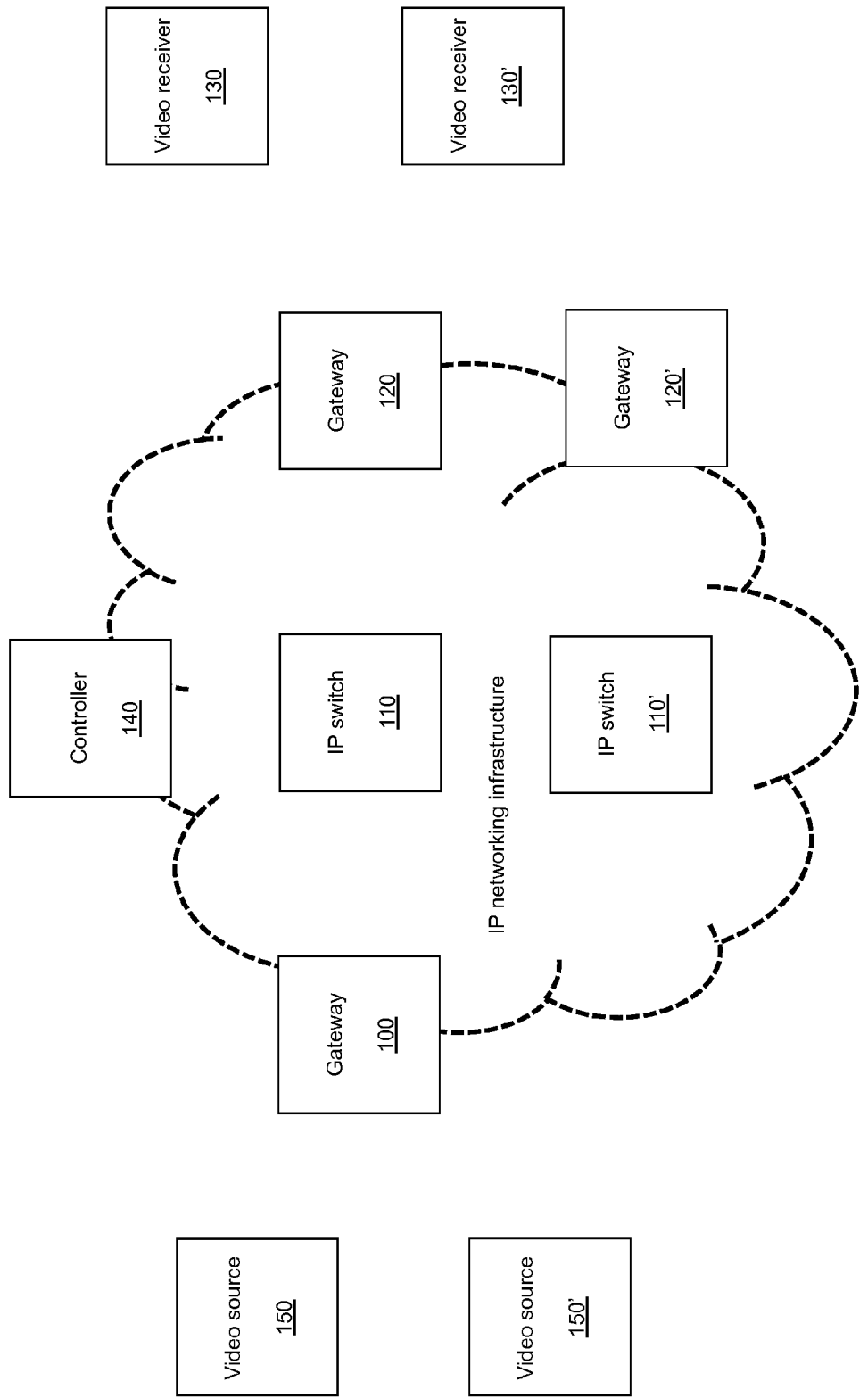

Referring more particularly to FIGS. 7B and 7C, a controller 140 is represented. The controller 140 is a computing device (e.g. computer, server, etc.) capable of exchanging control plane messages with various entities, such as the gateways 100 and 120. The control plane messages are used for exchanging at least one of the following: commands, alarms, reports, etc.

The controller 140 may include a user interface (not represented in the Figures), allowing a user to enter user commands. The user commands are processed by the controller 140 to generate a control plane message 141, which is transmitted to a target gateway (e.g. 100 or 120). The control plane message 141 can be transported via the IP protocol, by sending the generated control plane message 141 to an IP switch (e.g. 110), which forwards them to the target gateway (e.g. 100 or 120).

Upon reception of the control plane message 141, a processing unit of the target gateway (e.g. 100 or 120) interprets the received signal, and processes at least one packet of the IP flow based on the received control plane message. Commands comprised in the received control plane message can be applied to all packets of a particular IP flow, or only to specific packets of the particular IP flow matching a specific condition. Commands can also be applied to a plurality of IP flows matching a particular condition. For example, the gateway 100 receives a control plane message comprising a command to be applied to all packets of the IP flow 111 generated by converting the received SDI video signal 101. In another example, the gateway 100 receives a control plane message comprising a command to be applied to all packets of the IP flow 111 generated by converting the received SDI video signals 101 and 102. The control plane message and/or the command comprised therein can be stored in a memory of the target gateway (e.g. 100 and 120), so that it can be applied to packets matching a specific condition which is not currently matched. Commands are generally applied to (at least one of) the IP packets which constitute an IP flow, but can also be applied to lower level packets, such as Ethernet frames transporting the IP packets.

The controller 140 may also generate control plane messages without resorting to a user interface: for instance, by executing scripts which automatically generate commands, or by automatically generating alarms/reports received from the gateways 100 and/or 120.

The control plane message (e.g. 141) can be transmitted to one or more target gateways (e.g. 100 and/or 120). The control plane message 141 comprises one or more commands, and may include for each specific command one or more parameters for the specific command. The parameters of a specific command include at least one of the following: one or more conditions for applying the command, an identification of the one or more IP flow(s) for which the specific commands needs to be applied, etc. A control plane message (e.g. 142) can also be generated by one or more source gateways (e.g. 100 and/or 120) and transmitted to the controller 140. Control plane messages 142 can include alarms, reports, etc. An alarm generally identifies a critical condition at a gateway (e.g. 100 or 120), which requires a corrective action (for instance, a control plane message 141 is further generated and transmitted by the controller 140 upon reception of the control plane alarm 142). A report generally comprises a list of operational parameters of a gateway (e.g. 100 or 120), and is usually for immediate informative purposes or for logging purposes. A report 142 can be generated in response to a command 141 requesting sending of the report.

Control plane messages may be compliant with a standardized Control plane Signaling protocol, such as the Simple Network Management Protocol (SNMP), OpenFlow, etc. Alternatively, control plane messages are compliant with a proprietary Control plane Signaling protocol.

Examples of commands transmitted via control plane messages 141 to a source gateway 100 and applied to the IP flow 111 generated by the source gateway 100 include: modifying a destination address (e.g. the IP destination address) of one or more packets of the IP flow 111, filtering one or more packets of the IP flow 111 based on their source and/or destination address (e.g. source and/or destination IP address), modifying a QoS parameter of one or more packets of the IP flow 111 (e.g. layer 2 and/or layer 3 QoS parameter), compressing one or more packets of the IP flow 111, encrypting one or more packets of the IP flow 111, etc. The compression and encryption may be performed at different layers of the IP protocol stack (e.g. at the IP layer, at the transport layer, at the application layer), as is well known in the art.

Examples of commands transmitted via control plane messages 141 to a destination gateway 120 and applied to the IP flow 121 received by the destination gateway 120 include: filtering one or more packets of the IP flow 121 based on their source and/or destination address (e.g. source and/or destination IP address), decompressing one or more packets of the IP flow 121, decrypting one or more packets of the IP flow 121, etc.

Examples of reports transmitted via control plane messages 142 by a source gateway 100 include: number of packets transmitted for the IP flow 111 over a given interval of time, average/maximum/minimum latency between two packets of the IP flow 111 over a given interval of time, etc.

Examples of alarms transmitted via control plane messages 142 by the source gateway 100 include: loss of a video signal (e.g. 101) used for generating a corresponding IP flow 111, etc.

Examples of reports transmitted via control plane messages 142 by the destination gateway 120 include: number of packets received for the IP flow 121 over a given interval of time, average/maximum/minimum latency between two packets of the IP flow 121 over a given interval of time, etc.

Examples of alarms transmitted via control plane messages 142 by the destination gateway 120 include: number of packets lost for the IP flow 121 superior to a pre-defined threshold over a given interval of time, average latency between two packets of the IP flow 111 superior to a pre-defined threshold over a given interval of time, etc.

In a particular embodiment, at least some of the functionalities of the controller 140 for generating control plane messages 141 including commands, and for receiving control plane messages 142 including alarms or reports, are implemented by the IP switch 110.

In another particular embodiment, the controller 140 generates and sends control plane messages 141 including commands to the IP switch 110, and the IP switch 110 processes at least one packet of the IP flow (111 and/or 121) based on the received control plane message 141. The IP switch 110 also generates and sends control plane messages 142 including alarms or reports to the controller 140.

Referring now concurrently to FIGS. 8A, 8B, 8C and 9, the previously described IP based distribution system further uses SFP units as interfaces to the IP switch 110 as known in the prior art.

Figure 8A:
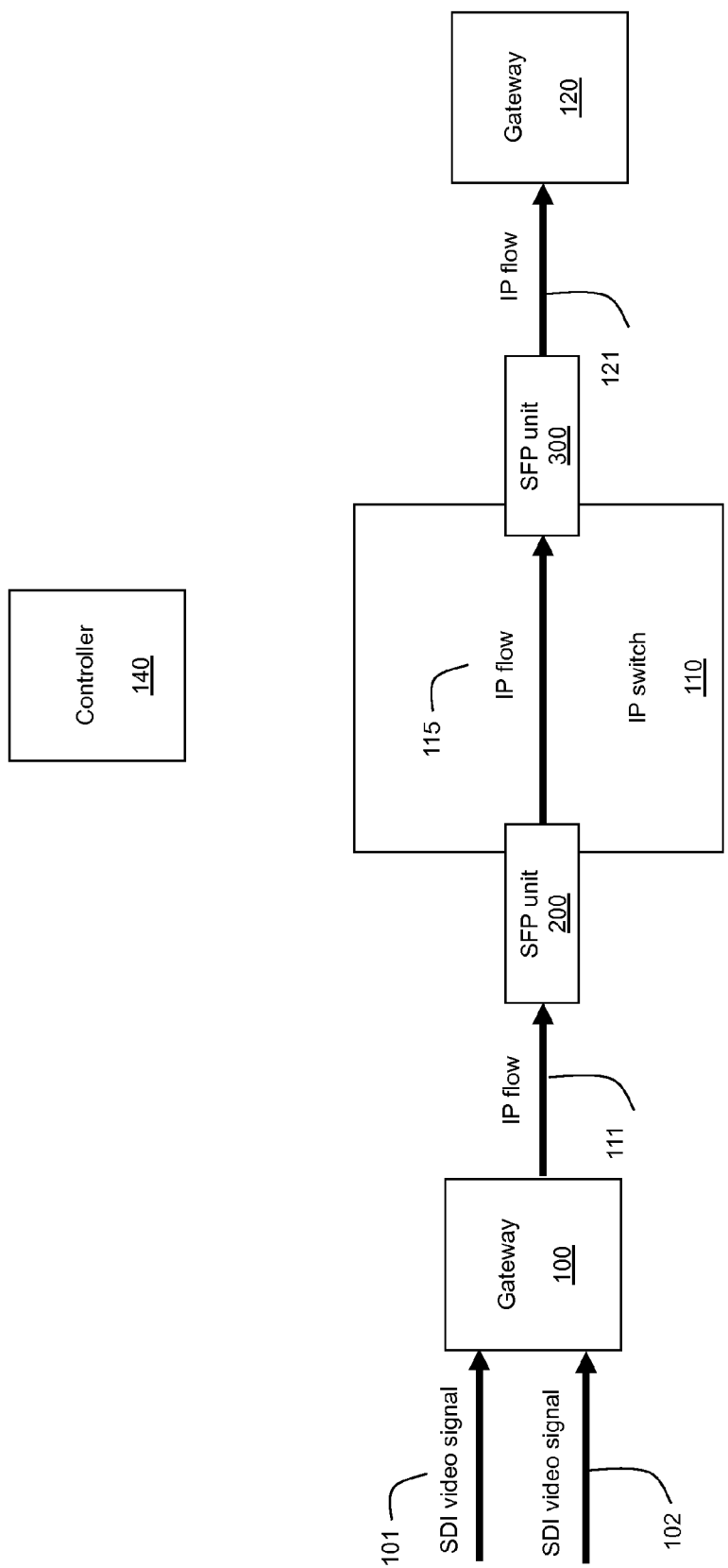
FIGS. 8A to 8C represent the IP based video distribution system of FIGS. 7A to 7D further using SFP units as interfaces to an IP switch, according to the prior art.
Figure 9:
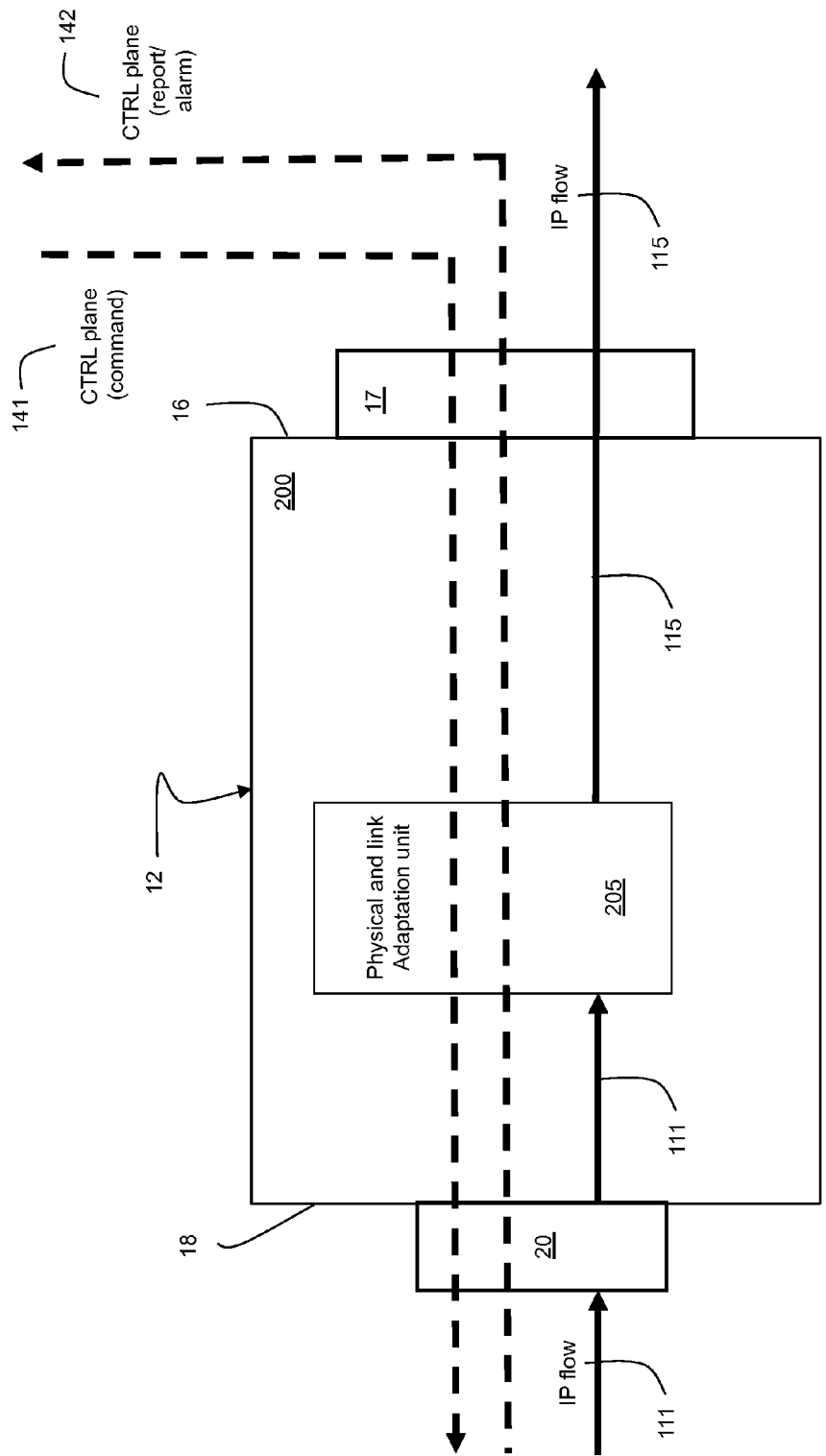
FIG. 9 represents a simplified exemplary block diagram of an SFP unit represented in FIGS. 8A to 8C, according to the prior art.

Referring particularly to FIGS. 8A and 9, a SFP unit 200 is inserted into a chassis of the IP switch 110. The SFP unit 200 receives the IP flow 111 transmitted by the source gateway 100 via a first connector of the SFP unit 200, and transmits a corresponding IP flow 115 to the IP switch 110 via a second connector of the SFP unit 200. The IP flow 115 is processed by a processing unit of the IP switch 110 (not represented in the Figures) to determine to which destination each received IP flow 115 shall be forwarded by the IP switch 110.

Prior art SFP unit 200 only implements an interface to the IP switch 110 and does not process the IP flow at the Internet, transport and application layers. However, the SFP unit 200 may process the physical and link layers of the IP flow, for example to convert a video data signal received via an optical connector (not shown) of the SFP unit 200 into the IP flow 115 transmitted via an electrical connector of the SFP unit 200.

FIG. 9 represents an exemplary block diagram of prior art SFP units 200. Prior art SFP units 200 correspond to the SFP unit 10 represented in FIGS. 1-6. Additional components of prior art SFP units 200, such as a processing unit 205, are internal to the SFP unit's housing 12. The housing 12 has specific standardized dimensions and is adapted to being inserted into a chassis of the IP switch 110.

Prior art SFP units 200 comprise at least one connector 20 on a front panel 18 of the housing 12 for receiving the IP flow 111. As mentioned previously, the IP flow 111 may transport for example a video payload, and optionally at least one of an audio payload and a metadata payload. The IP flow 111 received via the at least one connector 20 is received from the source gateway 100, and can also be received from additional source gateways not represented in the Figures. The at least one connector 20 may consist of an electrical or optical connector, adapted for receiving a signal transporting the IP flow from respectively an electrical or optical cable connected to the SFP unit 200 via the connector 20. The IP flow 111 has a physical layer adapted for the transport of IP packets, such as Ethernet, Synchronous Optical Networking (SONET)/Synchronous Digital Hierarchy (SDH), etc.

The prior art SFP unit 200 comprises a rear interface 17 on a back panel 16 of the SFP unit 200 for outputting the IP flow 115 to the IP switch 110. For instance, the rear interface 17 is an electrical connector.

A physical and link adaptation unit 205 within the housing 12 of prior art SFP units 200 outputs the received IP flow 111 as IP flow 115 to the IP switch 110. For example, the physical and link adaptation unit 205 adapts if necessary the physical and link layers of the IP flow 111 received via an optical connector 20 into the IP flow 115 outputted via an electrical rear interface 17. As previously mentioned, the physical and link adaptation unit 205 does not perform an adaptation of the IP flow itself, such as found on the network and application layers; but may perform an adaptation of the physical and link layers. Although a single physical and link adaptation unit 205 is represented in FIG. 9, the functionalities of the physical and link adaptation unit 205 may be split between several units; one of them being for example closely integrated with each of the at least one front connector 20 and another one of them being closely integrated with the rear interface 17.

Although not illustrated in FIG. 9, a second IP flow can also be received via a second connector on the front panel 18 of the SFP unit 200 (e.g. connector 21 represented in FIG. 2), from source gateway 100 and/or from additional source gateways not illustrated in the Figures. The IP flow received via the second front connector processed in a similar manner as the IP flow received via front connector 20, to generate the corresponding IP flow 115 outputted by the rear interface 17.

Reverting to FIG. 8A, another SFP unit 300 may alternately or concurrently be inserted into the chassis of the IP switch 110. The SFP unit 300 is similar to the SFP unit 200 shown in FIG. 9. The SFP unit 300 receives the IP flow 115 transmitted by the IP switch 110 via a back connector of the SFP unit 300, and transmits a corresponding IP flow 121 to the destination gateway 120 via a front connector of the SFP unit 300. As mentioned previously, the IP flow 115 has been received by the IP switch from the SFP unit 200 and processed by a processing unit of the IP switch 110, to determine the destination gateway 120 to which the IP flow 115 shall be forwarded by the IP switch 110 through the SFP unit 300.

The SFP unit 300 is similar to the SFP unit 200, and only adapts the physical and link layers of the IP flow as previously described for the SFP unit 200, and does not process the IP flow at the Internet, transport and application layers.

Although not illustrated in FIG. 8A, a plurality of SFP units 200 may be inserted into the chassis of the IP switch 110. Each of the plurality of SFP units 200 receives an IP flow (e.g. 111) transmitted by source gateways (e.g. 100) via a first connector of the SFP units 200, and each SFP unit 200 transmits a corresponding IP flow (e.g. 115) to the IP switch 110 via a second connector of the SFP units 200.

Similarly, a plurality of SFP units 300 may be inserted into the chassis of the IP switch 110. Each of the plurality of SFP units 300 receives an IP flow (e.g. 115) transmitted by the IP switch 110 via a first connector of the SFP units 300, and each SFP unit 300 transmits a corresponding IP flow (e.g. 121) to a destination gateway (e.g. 120) via a second connector of the SFP units 300.

Furthermore, the SFP unit 200 may be adapted for simultaneously receiving the IP flow 111 from the source gateway (e.g. 100) and transmitting the IP flow 121 to destination gateways (e.g. 120). For instance, the rear interface 17 of the SFP unit 200 is used for exchanging (both transmitting and receiving) the IP flow 115 with the IP switch 110, while a front connector of the SFP unit 200 is used for simultaneously receiving the IP flow 111 from source gateways (e.g. 100) and transmitting the IP flow 121 to the destination gateways (e.g. 120). Alternatively, the front connector 20 of the SFP unit 200 is dedicated to the reception of the IP flow 111 and a second front connector of the SFP unit 200 may be dedicated to the transmission of the IP flow 121.

In a particular aspect, the IP flow 111 generated by the source gateway 100 are either unicast or multicast IP flows. A combination of unicast and multicast IP flow 111 can be received by the SFP unit 200 (e.g. via a front connector 20) and transmitted to the IP switch 110 (e.g. via a rear interface 17). Similarly, a combination of unicast and multicast IP flow 115 can be received by the SFP unit 300 (e.g. via a rear interface 17) and transmitted to the destination gateway 120 (e.g. via a front connector 20).

Figure 8B:
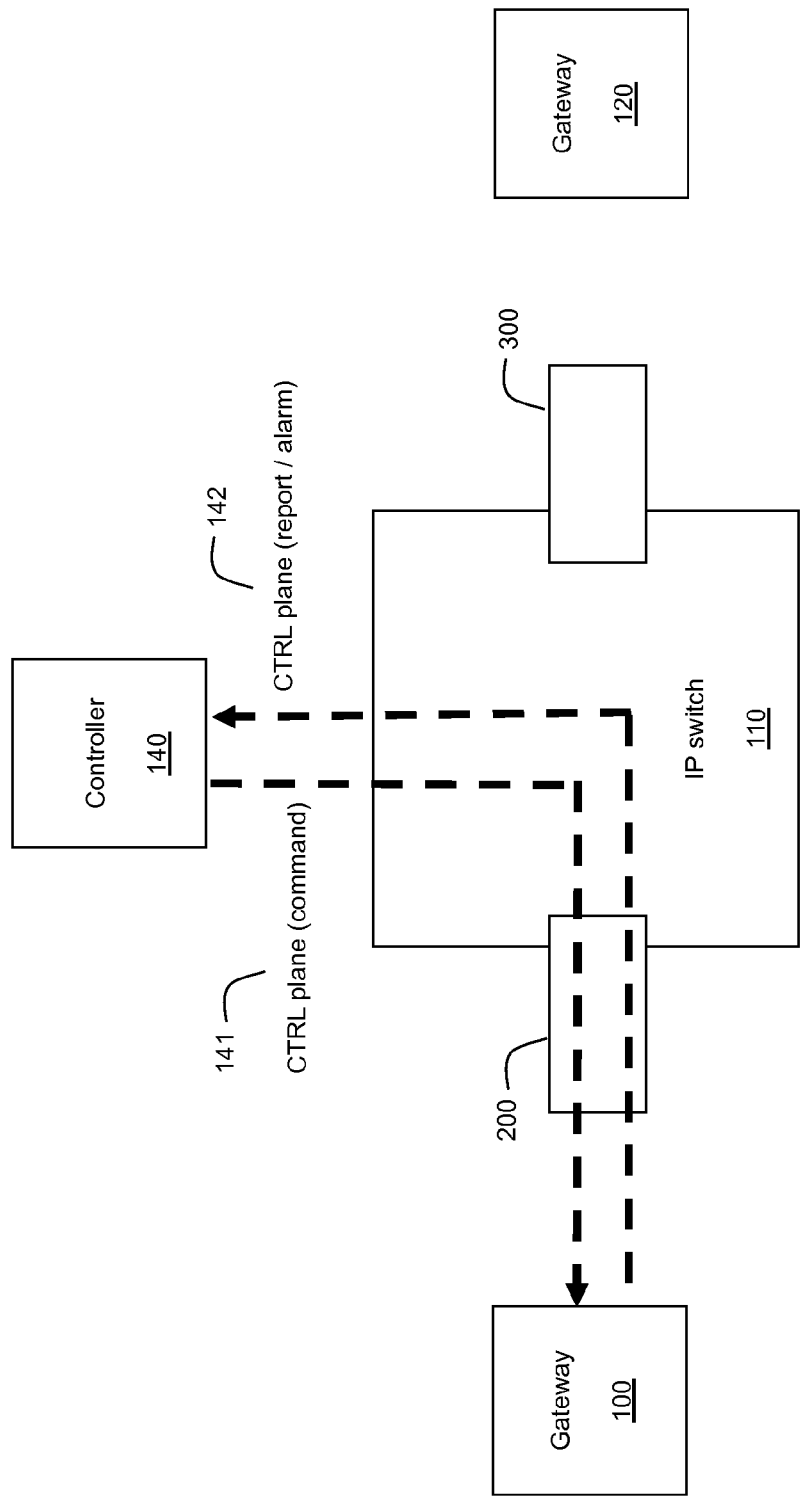
Figure 8C:
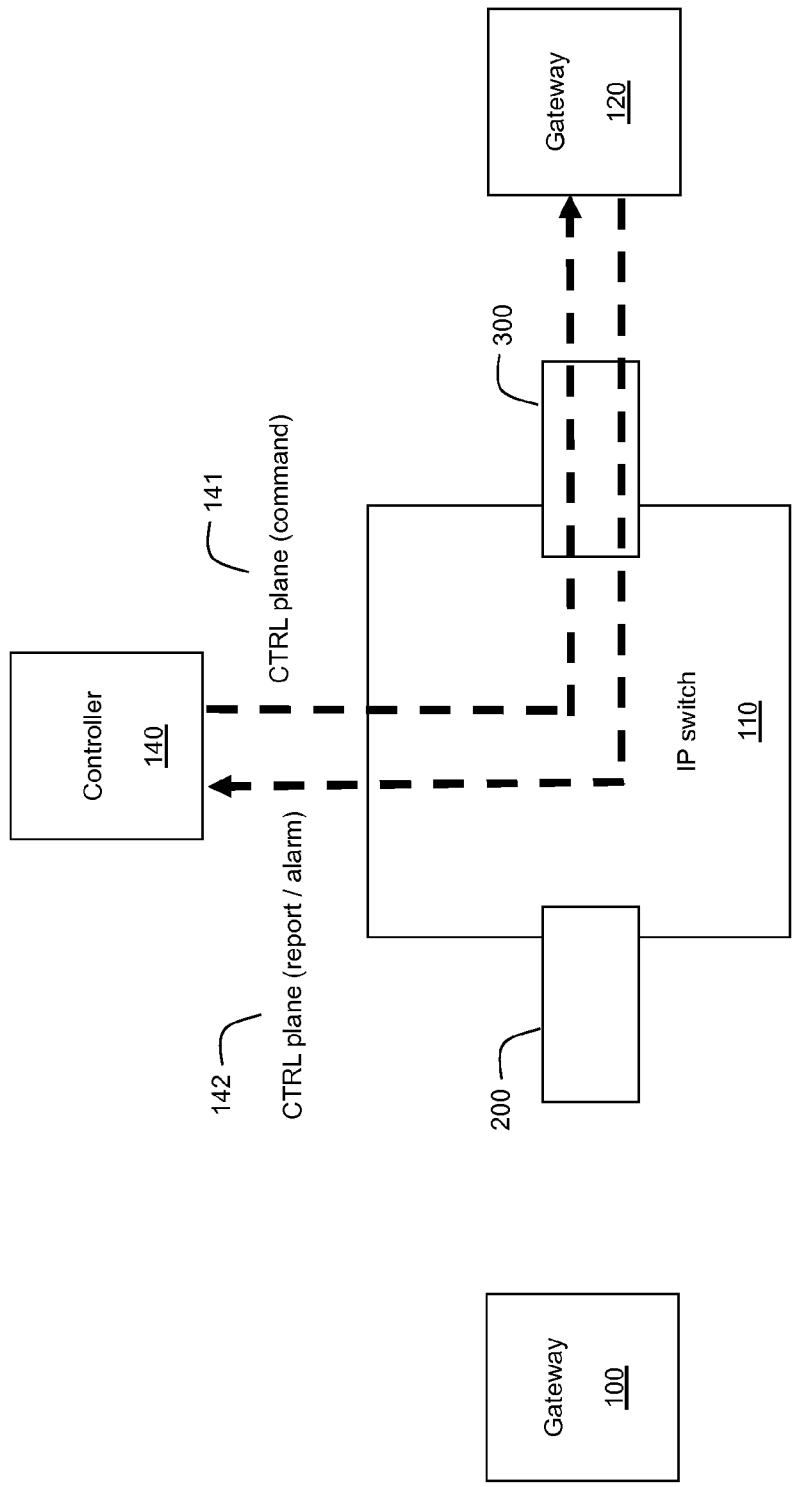

Referring now particularly to FIGS. 8B, 8C and 9, prior art SFP units 200 and 300 also transmit IP based control plane messages exchanged between the controller 140 and respectively the source gateways 100 and destination gateways 110, via the IP switch 110.

FIG. 8B illustrates a control plane message 141 comprising at least one command transmitted from the controller 140 to the IP switch 110, and forwarded by the IP switch 110 to the source gateway 100, via the SFP unit 200. For instance, the control plane message 141 is received by the rear interface 17 of the SFP unit 200 from the IP switch 110, and transmitted to the source gateway 100 via the front connector 20 of the SFP unit 200.

FIG. 8B further illustrates a control plane message (alarm or report) 142 transmitted from the source gateway 100 to the IP switch 110, and forwarded by the IP switch 110 to the controller 140, via the SFP unit 200. For instance, the control plane message 142 is received by the front connector 20 of the SFP unit 200 from the source gateway 100, and transmitted to the IP switch 110 via the rear interface 17 of the SFP unit 200.

The SFP unit 300 represented in FIG. 8C operates in a similar manner as the SFP unit 200 represented in FIG. 8B, with respect to the control plane messages (e.g. 141 and 142) exchanged between the controller 140 and the destination gateway 120 via the IP switch 110 there through.

The control plane messages 141 and 142 are adapted by the physical and link adaptation unit 205 in a manner similar to the previously described IP flows 111, 115 and 121. In particular, the physical and link adaptation unit (e.g. 205) does not process the control plane messages 141 and 142 at the Internet, transport and application layers. However, the physical and link adaptation unit (e.g. 205) adapts the control plane message 142 received via one type of connector of the SFP unit 200 into the control plane message 142 transmitted via another type of connector by the SFP unit 200.

Figure 10:
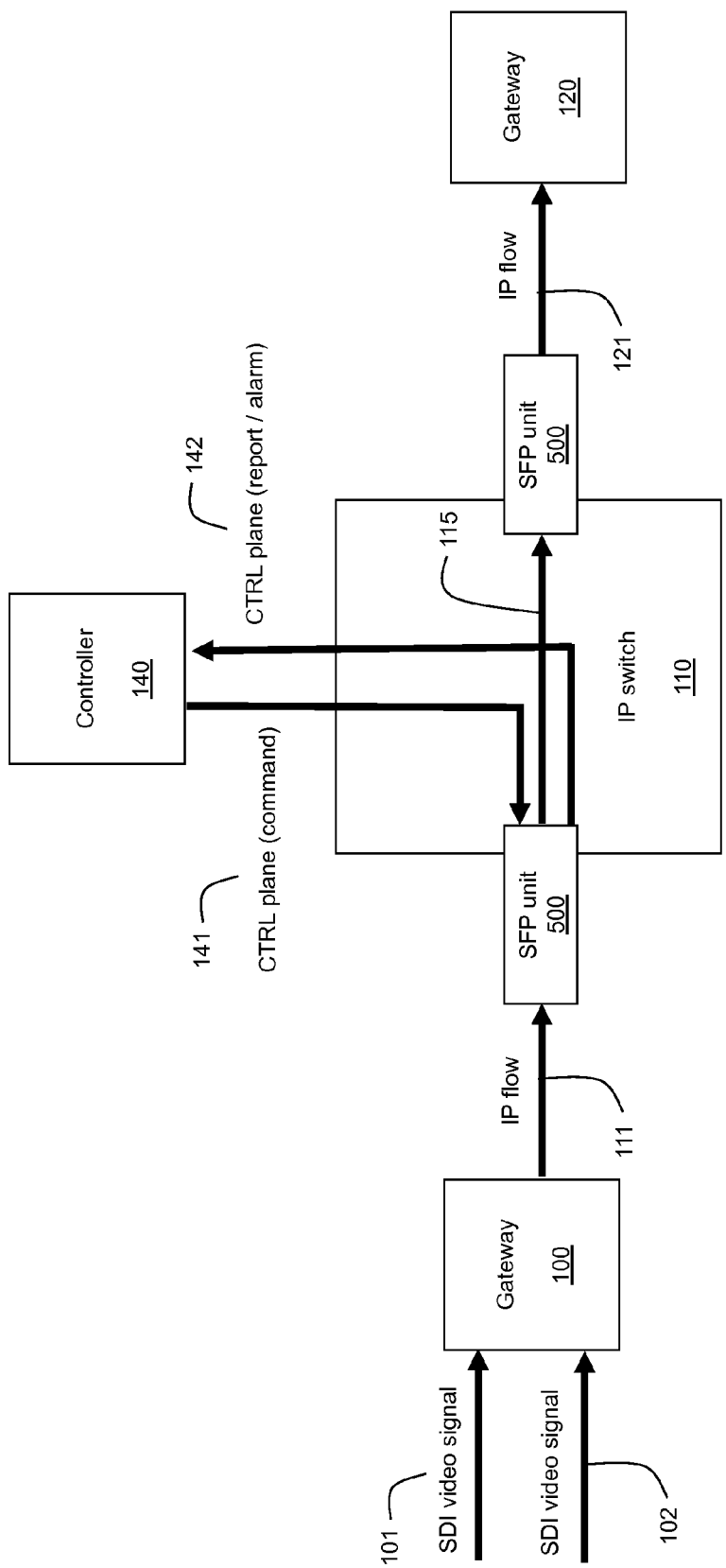
FIG. 10 illustrates an exemplary network configuration with IP flow and signaling with SFP having control plane management functionalities.
Figure 11:
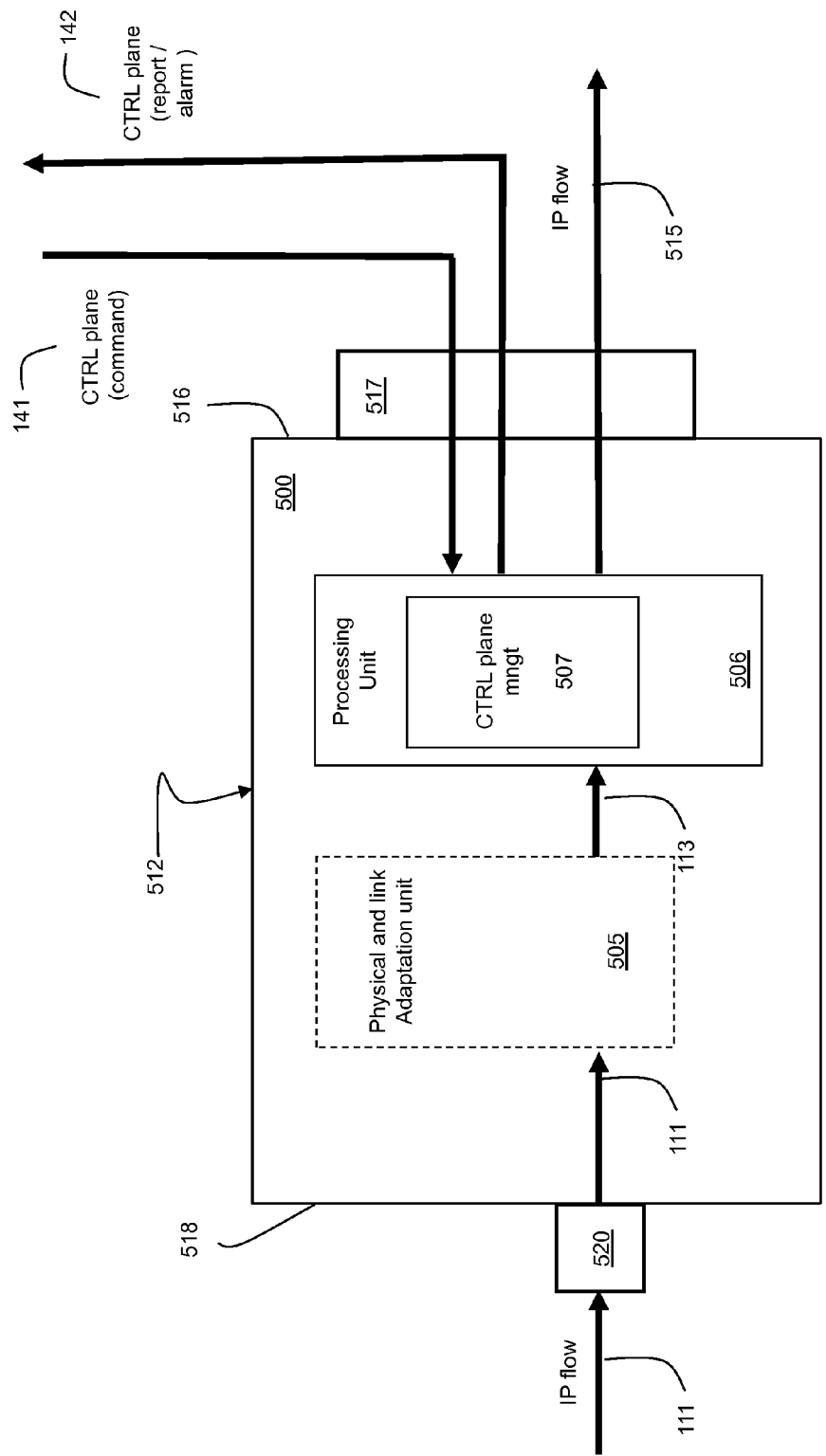
FIGS. 11 and 12 illustrate a functional representation of the present SFP units with control plane management functionalities.

Referring now concurrently to FIGS. 10 and 11, an SFP unit 500 with control plane management functionality 507 will be described. In particular, at least some of the control plane management functionalities previously implemented by the gateways 100 and 120 are now implemented and performed by the SFP unit 500. Although shown as inserted within the IP switch 110, the present SFP unit 500 may be inserted in any component of the network shown on 7D, such as for example the IP switches 110 and 110', the gateways 100, 120 and 120', the video sources 150, 150' and/or the video receivers 130, 130'. The present SFP unit 500 thus provides a fully scalable and flexible solution to management of IP flows within a network or a sub-network, by performing control plane management functionalities on a per IP flow/per SFP basis, rather than on a per IP Switch or per Gateway basis. By providing the control plane management functionalities at the SFP level, the present SFP unit 500 reduces the need for changing very expensive equipment (IP switches and Gateways), reduces the impact of changing the equipment on the network as the addition of new SFP units 500 to current IP switches and gateways suffices to increase and/or update the capabilities of existing IP switches and gateways. Furthermore, the present SFP unit 500 allows the transfer of certain control plane management functionalities to be migrated and performed elsewhere in the network, rather than the current concentrated functionalities performed by the IP switches and Gateways.

The present SFP unit 500 includes a housing 512 having a front 518 and a back 516. The front 518 comprises at least one connector 520, which may be either electrical or optical connector(s). The back 516 also comprises a rear interface 517 to be in electrical connection with a connector of a housing (not shown) in which the SFP unit 500 is inserted and as known in the industry.

The present SFP unit 500 may also include a physical and link adaptation unit 505, corresponding to the physical and link adaptation unit 205 previously discussed in reference to FIG. 9.

The present SFP unit 500 further includes a processing unit 506 on which instructions for performing control plane management functionalities 507 have been stored and compiled. Upon execution by the processing unit 506, the control plane management functionalities 507 allow the SFP unit 500 to process the IP flow(s) transported through the SFP 500 at the Internet, transport and application layers (referred herein as the control plane management functionalities).

The IP flows 111 and 115 represented in FIG. 11 may transport any type of applicative payload (e.g. web traffic, voice over IP (VoIP), video stream, audio stream, metadata, etc.). The control plane management functionalities 507 implemented by the SFP unit 500 may be used for controlling any IP flow transiting through the SFP unit 500. In the rest of the description, the control plane management functionalities 507 will be described in the context of IP flows transporting a video payload for illustration purposes only, and can be generalized to IP flows transporting any type of applicative payload.

The SFP unit 500 receives the control plane message 141 via the rear interface 517, as shown on FIG. 11, or could alternately receive the control plane message 141 via one of the at least one connector 520 on the front panel of the housing 512. The control plane message 141 is processed by the processing unit 506 using the control plane management functionalities 507. If a command of the control plane message 141 is to be performed by the SFP unit 500, the control plane message 141 is stored by the control plane management functionality 507 which is executed by the processing unit 506, stops at the SFP unit 500 and is not passed to other network components such as the gateway (100, 120). However, if the command of the control plane message 141 is to be performed by another network component than the SFP unit 500, the control plane message 141 is outputted by one of the connectors 520 and not stored by the control plane management functionality 507 or executed by the processing unit 506.

In a first embodiment, the controller 140 transmits the control plane messages 141 for the IP flow 111 directly to the SFP unit 500 (e.g. to an IP address allocated to the SFP unit 500). In an alternative embodiment, the controller 140 transmits the control plane message 141 for the IP flow 111 in the form of broadcast or multicast messages, so that the control plane message 141 is forwarded to all SFP units, IP switches 110 and gateways 100 and 120. The control plane management functionalities 507 of the SFP unit 500 identify the particular control plane message 141 specifically targeting the IP flow 111 received by the SFP unit 500, to process at least one packet of the targeted IP flow 111 based on the control plane message 141. In another alternative embodiment, the controller 140 transmits the control plane message 141 in relation to the IP flow 111 to the source equipment (e.g. gateway 100) generating the IP flow 111 (via the IP switch 110 and SFP unit 500). The control plane management functionalities 507 of the SFP unit 500 intercept the control plane message 141 targeting the IP flow 111, and process at least one packet of the targeted IP flow 111 based on the intercepted control plane message 141.

The source of the control plane messages 141 is not limited to the controller 140, but these control plane messages 141 may be received from other computing devices not represented in the Figures.

The SFP unit 500 receives the IP flow 111 via the connector 520 for exemplary purposes only, but the IP flow 111 could alternately be received by the rear interface 517 without departing from the present description.

If necessary, the IP flow 111 may first be adapted by the physical and link adaptation unit 505 before being passed as an adapted IP flow 113 to the processing unit 506. The physical and link adaptation unit 505 performs adaptation of the IP flow as previously discussed with reference to the physical and link adaptation unit 205.

The processing unit 506 receives the IP flow 111 or the adapted IP flow 113, and determines whether a control plane command is to be performed for the IP flow (111 or 113) based on the received control plane messages 141. The command to be performed by the control plane management functionality 507 is generally applied to some or all the IP packets (Internet layer) of the IP flow, but can also be applied to lower level packets, such as Ethernet frames (link layer) transporting the IP packets, so as to generate the processed IP flow 515.

As mentioned previously, the control plane message 141 comprises one or more commands, and may include for each specific command one or more parameters for the specific command. The parameters of a specific command include at least one of the following: one or more conditions for applying the command, an identification of the one or more IP flows for which the specific commands needs to be applied, etc. In particular, the identification of the IP flow (e.g. 111) may consist in its source address (e.g. the IP address of the source gateway 100), in its destination address (e.g. the IP address of the destination gateway 120), in a combination of its source and destination addresses, in a specific identifier located in the payload transported by the IP flow, etc.

Examples of commands transmitted via the control plane message 141 and applied to the IP flow 111 by the control plane management functionalities 507 of the processing unit 506 include at least one of the following:

Modifying a destination address of one or more packets of the IP flow 111. For instance, the IP packets of the IP flow 111 have a destination address set to the destination gateway 120. The IP packets of the corresponding IP flow 515 (i.e. after processing by the control plane management functionalities 507) have a destination address set to another destination gateway (e.g. destination gateway 120' represented in FIG. 7A). The redirection to another destination gateway can be based on the original destination gateway 120 only (e.g. all IP flows with a destination set to destination gateway 120 are redirected), or may also take into consideration the source gateway (e.g. only IP flows 111 from the source gateway 100 are redirected).

Filtering one or more packets of the IP flow 111 based on their source and/or destination address. For instance, the IP packets of all the IP flows (e.g. 111) received via the front connector 520, which have a source address set to the source gateway 100 and/or a destination address set to the destination gateway 120 are filtered. Filtering the packets consists in dropping the packets that match the filter, or alternatively allowing the packets that match the filter. The filtering may be based on additional parameters transmitted by the control plane message, as is well known in the art.

Modifying a QoS parameter of one or more packets of the IP flow 111. For instance, the IP packets of the IP flow 111 are assigned a higher priority than other IP flows transported over the IP networking infrastructure represented in FIG. 7D. For this purpose, a layer 2 (e.g. Ethernet layer) and/or layer 3 (Internet layer) QoS parameter specified in the control plane message 141 is applied by the control plane management functionalities 507 of the processing unit 506 to the IP packets of the IP flow 111 to generate the processed IP flow 515.

Compressing one or more packets of the IP flow 111 or encrypting one or more packets of the IP flow 111. The compression and encryption may be performed at different layers of the IP protocol stack (e.g. at the IP layer, at the transport layer, at the application layer), as is well known in the art. The source equipment (e.g. gateway 100) which generates and transmits the IP flow 111 is generally not aware of the characteristics of the IP networking infrastructure such as those represented in FIG. 7D for example. However, the controller 140 generally has this knowledge, and may determine that some particular IP flow 111 generated by the source equipment (e.g. gateway 100) and transiting through the SFP 500 needs to be compressed (e.g. to adapt to a portion of the IP networking infrastructure having a lower bandwidth) or encrypted (e.g. to adapt to a portion of the IP networking infrastructure requiring a specific level of security). The determination can be based on the destination equipment (e.g. gateway 120) of the IP flow 111 generated and transmitted by the source equipment (e.g. gateway 100). The controller 140 transmits to the SFP unit 500 the characteristics (e.g. source and destination addresses) of the IP flow (e.g. 111) which is to be compressed or encrypted by the processing unit 506 of the SFP unit 500; along with specific parameters needed for performing the compression or encryption.

Decompressing one or more packets of the IP flow 111 which have been compressed by a source equipment (e.g. gateway 100), or decrypting one or more packets which have been encrypted by a source equipment (e.g. gateway 100). For instance, the packets of the IP flow 111 generated by gateway 100 are either compressed or encrypted by the gateway 100. The IP flow 111 is received by the SFP unit 500, and the control plane management functionalities 507 of the processing unit 506 either decompress or decrypt the packets of the IP flow 111, based on the control plane message 141 received by the SFP unit 500 from the controller 140. The controller 140 transmits to the SFP unit 500 the characteristics (e.g. source and destination addresses) of the IP flow which needs to be decompressed or decrypted; along with specific parameters needed for performing the decompression or decryption, so that the decompression or decryption of the IP packets of the IP flow 111 be performed by the control plane management functionalities 507 of the processing unit 506 within the SFP 500 through which the IP flow 111 transits.

The aforementioned examples are for illustration purposes only, and are not intended to limit the control plane management features implemented by the control plane management functionalities 507 of the processing unit 506. In particular, a plurality of control plane management features originally implemented in other equipments (e.g. gateways 100 or 120 and IP switch 110) may be performed by the control plane management functionalities 507 of the processing unit 506.

In a particular aspect, the control plane management functionalities 507 of the processing unit 506 perform multi-viewer functionality. The present SFP unit 500 receives a plurality of IP flows 111 via one or more front connectors 520. The control plane management functionalities 507 of the processing unit combines the plurality of received IP flows 111 into a multi-video image IP flow, and output the multi-video image IP flow 515 via the rear interface 517 of the SFP unit 500. Alternatively, the multi-video image IP flow 515 is outputted via a front connector (e.g. 520) of the SFP unit 500 (not illustrated in FIG. 11). The combination of the plurality of IP flows 111 is based on a control plane message 141 received by the SFP unit 500 and executed by the control plane management functionality 507 of the processing unit 506 to generate the multi-video image IP flow 515. The control plane message 141 indicates which received IP flows 111 shall be combined, and how the IP flows 111 shall be combined by the control plane management functionality 507 of the processing unit 506. For example, the SFP unit 500 receives three IP flows 111 (not shown) and the control plane message 141 identifies two IP flows among the three received IP flows to be combined in the multi-video image IP flow 515. Furthermore, the control plane message 141 indicates that one of the combined IP flow is to be positioned at the top of the image and the other combined video IP flow is to be positioned at the bottom of the image of the multi-video image IP flow 515. Alternatively, the control plane message 141 indicates that one of the combined IP flows is to be positioned on the left side of the image and the other combined video IP flow is to be positioned on the right side of the image of the multi-video image IP flow 515. Alternatively, the control plane message 141 determines that one of the combined IP flows is to be positioned on the left side of the image and the other combined video IP flow is to be positioned on the right side of the image of the multi-video image IP flow 515. In another example, the SFP unit 500 receives four IP flows and the control plane message 141 indicates that one of the combined IP flow is to be positioned on the top-left side of the image, another of the combined IP flow is to be positioned at the bottom-left side of the image, another of the combined IP flow is to be positioned at the top-right side of the image and the last combined video IP flow is to be positioned at the bottom-right side of the image by the control plane management functionality 507 of the processing unit to generate the multi-video image IP flow 515.

In another aspect, the processing unit 506 of the SFP unit 500 with control plane management functionalities 507 generates a report related to the received IP flow 111. The report is transmitted by the SFP unit 500 to a third party computing device, such as the controller 140. The report can be transmitted via the connector 520 receiving the IP flow 111 or via another connector of the SFP unit 500.

For instance, as illustrated in FIGS. 10 and 11, the processing unit 506 of the SFP unit 500 with control plane management functionalities 507 generates a control plane message 142 comprising a report related to the IP flow 111 received via the front connector 520 (for example quality parameters of the IP flow 111 received from the source gateway 100). The control plane message 142 comprising the report is outputted via the rear interface 517 to the IP switch 110, and forwarded to the controller 140.

Examples of reports transmitted via the control plane messages 142 include: number of packets received for the IP flow 111 over a given interval of time, number of packets lost for the IP flow 111 over a given interval of time, average/maximum/minimum latency between two packets of the IP flow 111 over a given interval of time, average throughput of the IP flow 111 over a given interval of time, etc. A report can be generated and transmitted for each IP flow received via the front connector 520, or only for a subset of the received IP flows. A control plane message 141 may be used to specify for which received IP flows a report shall be generated.

In still another aspect, the processing unit 506 of the SFP unit 500 with control plane management functionalities 507 generates an alarm related to the received IP flow 111. The alarm is transmitted by the SFP unit 500 to a third party computing device, such as the controller 140. The alarm can be transmitted via the connector 520 receiving the IP flow 111 or via another connector of the SFP unit 500.

For instance, as illustrated in FIGS. 10 and 11, the processing unit 506 of the SFP unit 500 performing the control plane management functionalities 507 generates a control plane message 142 comprising an alarm related to the IP flow 111 received via the front connector 520 (e.g. IP flow 111 received from the source gateway 100). The control plane message 142 comprising the alarm is outputted via the rear interface 517 of the SFP unit 500 to the IP switch 110, and forwarded to the controller 140.

Examples of alarms transmitted via the control plane messages 142 include: the number of packets lost for the IP flow 111 is superior to a pre-defined threshold over a given interval of time, the average latency between two packets of the IP flow 111 is superior to a pre-defined threshold over a given interval of time, the average throughput of the IP flow 111 is inferior to a pre-defined threshold over a given interval of time, etc.

Although FIG. 11 represents the control plane messages 142 being outputted via the rear interface 517 of the SFP unit 500, they may also be outputted via the front connector 520. The destination of the control plane messages 142 is not limited to the controller 140, but the control plane messages 142 may be directed to other computing devices.

Figure 12:
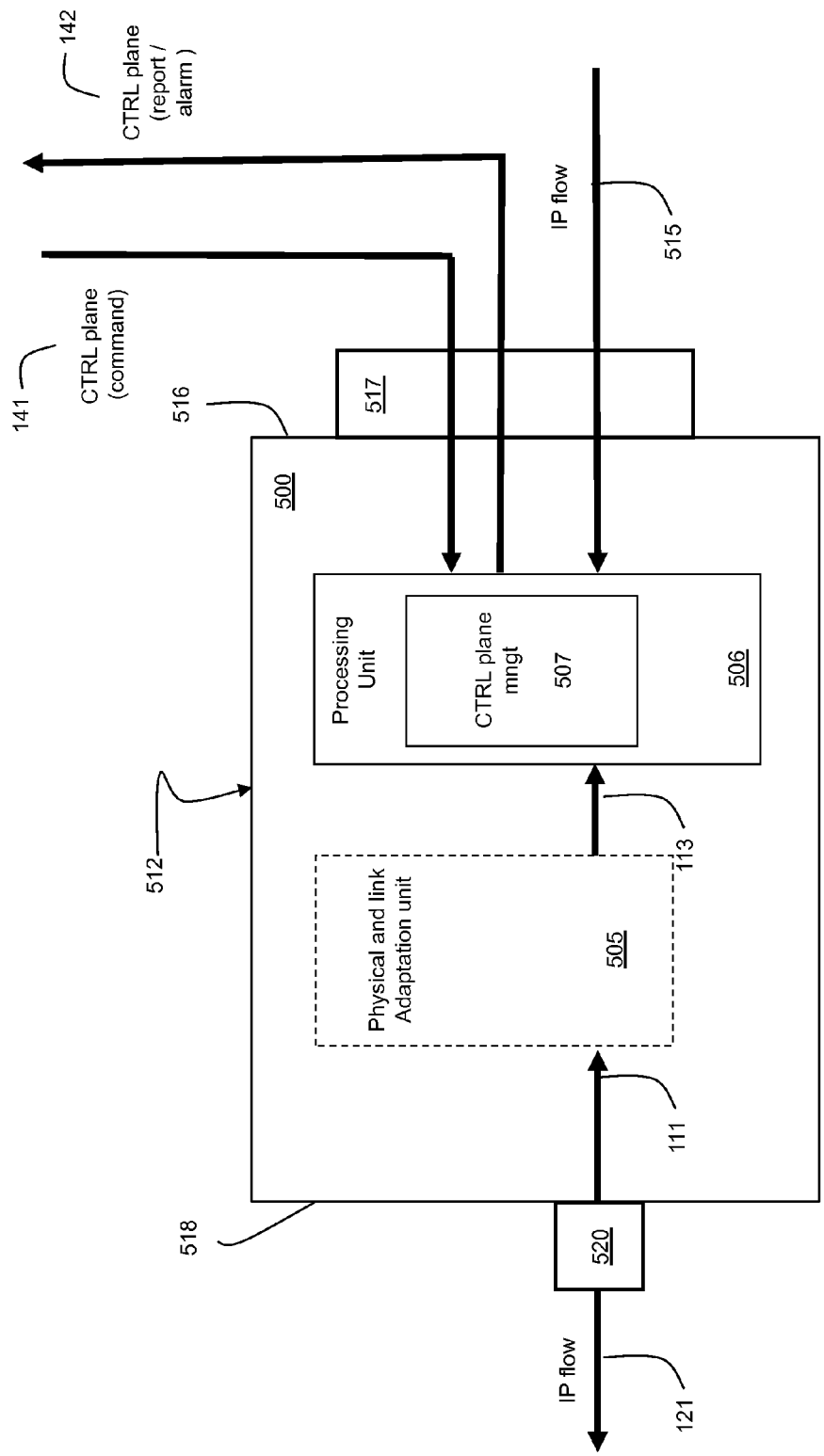

Referring now concurrently to FIGS. 10 and 12, processing by the control plane management functionalities 506 of an IP flow received via the rear interface 517 is illustrated.

The SFP unit 500 receives via the rear interface 517 the IP flow 515 transmitted for example by the IP switch 110, and outputs via the front connector 520 the IP flow 121 which has been properly processed by the control plane management functionalities 507 of the processing unit 506 if a control plan message 141 has been received for the IP flow 515, and optionally adapted by the physical and link adaptation unit 505 as previously discussed.

Although FIG. 12 represents the control plane messages 141 being received via the rear interface 517 of the SFP unit 500, this representation is for exemplary purposes only. The control plan messages 141 may be received via any connector of the SFP unit 500, i.e. any front connector 520 or through the rear interface 517. Furthermore, the source of the control plane messages 141 is not limited to the controller 140, as the control plane messages 141 may be received from other computing devices not represented in the Figures.

Although FIGS. 11 and 12 represent the control plane messages 142 being outputted via the rear interface 517 of the SFP unit 500, the control plane messages 142 may also be outputted via any of the front connector(s) 520 of the SFP unit 500. The destination of the control plane messages 142 is not limited to the controller 140, and the control plane messages 142 may be directed to other computing devices not represented in the Figures.

Although not illustrated in FIGS. 11 and 12, the control plane management functionalities 507 may be adapted for alternately or simultaneously processing IP flows received via one of a front connector 520 and a rear interface 517 of the same SFP unit simultaneously, concurrently and/or sequentially.

The present IP flows (111, 113, 515) may be transported via either the IPv4 or the IPv6 protocol, or any protocol sharing similar functionalities.

In a particular embodiment, at least some of the control plane messages 141 and 142 received or transmitted by the SFP unit 500 represented in FIGS. 11 and 12 are compliant with the SNMP protocol. In another embodiment, the control plane management messages 141 and 142 are compliant with the OpenFlow protocol. In still another embodiment, the IP flows 111, 113, 121 and 515 represented in FIGS. 11 and 12 are transported via the Real-time Transport Protocol (RTP), and at least some of the control plane messages 141 and 142 are compliant with the Real-time Transport Control Protocol (RTCP).

In yet another particular embodiment, the SFP unit 500 further includes a memory (not shown on FIGS. 11 and 12) for storing an action table illustrated in FIG. 13. For instance, the memory is included in the processing unit 506. Upon reception of the control plane message 141 comprising a command, the processing unit 506 analyzes the command, and the optionally associated parameters (e.g. conditions for applying the command, identification of at least one IP flow to which the command is to be applied), to determine an action to be performed on specific IP flows received by the SFP unit 500. The determined action, and the conditions for enforcing the determined action when applicable, are memorized in the action table. Upon reception of an IP flow (e.g. 111 in FIG. 11 or 515 in FIG. 12), the processing unit 506 uses the action table to determine if a particular action shall be applied to the received IP flow. For example, the first line of the action table represented in FIG. 13 specifies that an IP flow with the source IP address XXXX and the destination IP address YYYY shall be allowed. The second line of the action table specifies that an IP flow with the destination IP address ZZZZ shall be dropped. The third line of the action table specifies that an IP flow with the source IP address AAAA and the destination IP address BBBB shall have its destination IP address changed to CCCC. The previous examples are for illustration purposes only, and are not intended to limit the types of actions that may be stored in the action table, based on the received control plane messages 141.

In still another embodiment, the front connector 520 of the SFP units 500 represented in FIGS. 11 and 12 is a ten Gigabytes Ethernet interface.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A standardized hot-pluggable transceiving unit comprising:
   a housing having specific standardized dimensions and adapted to being inserted into a chassis of a hosting unit;
   a connector receiving an Internet Protocol (IP) flow; and
   a processing unit processing at least one IP packet of the received IP flow based on a control plane message, the processing comprising modifying the at least one IP packet of the received IP flow based on the control plane message and outputting the at least one modified IP packet, the control plane message being received by one of the following: the connector receiving the IP flow or another connector of the transceiving unit,
   whereby modifying the at least one IP packet of the received IP flow based on the control plane message comprises at least one of: modifying a destination address of the IP packet, modifying a Quality of Service (QoS) parameter of the IP packet, compressing or decompressing the IP packet, encrypting or decrypting the IP packet.

2. The standardized hot-pluggable transceiving unit of claim 1, wherein the received IP flow transports at least one of the following: a video payload, an audio payload, and a metadata payload.

3. The standardized hot-pluggable transceiving unit of claim 1, wherein the control plane message comprises at least one command to be applied by the processing unit to the IP flow.

4. The standardized hot-pluggable transceiving unit of claim 3, wherein the control plane message further comprises one or more parameters associated to the command, the one or more parameters comprising at least one of the following: a condition for applying the command, and an identification of at least one IP flow to which the command is to be applied.

5. The standardized hot-pluggable transceiving unit of claim 1, wherein the processing unit further generates a report related to the IP flow, the report being transmitted by the transceiving unit via one of the following: the connector receiving the IP flow or the other connector of the transceiving unit.

6. The standardized hot-pluggable transceiving unit of claim 5, wherein the report comprises at least one of the following: number of IP packets received for the IP flow over a given interval of time, number of IP packets lost for the IP flow over a given interval of time, average latency between two IP packets of the IP flow over a given interval of time, average throughput of the IP flow over a given interval of time.

7. The standardized hot-pluggable transceiving unit of claim 1, wherein the processing unit further generates an alarm related to the IP flow, the alarm being transmitted by the transceiving unit via one of the following: the connector receiving the IP flow or the other connector of the transceiving unit.

8. The standardized hot-pluggable transceiving unit of claim 7, wherein the alarm comprises at least one of the following: number of IP packets lost for the IP flow superior to a pre-defined threshold over a given interval of time, average latency between two IP packets of the IP flow superior to a pre-defined threshold over a given interval of time, average throughput of the IP flow inferior to a pre-defined threshold over a given interval of time.

9. The standardized hot-pluggable transceiving unit of claim 1, wherein the connector receiving the IP flow is located on a front panel of the housing and consists of one of the following: an electrical connector or an optical connector.

10. The standardized hot-pluggable transceiving unit of claim 9, wherein the control plane message is received via an electrical host connector located on a back panel of the housing.

11. The standardized hot-pluggable transceiving unit of claim 10, wherein the at least one modified IP packet is outputted via the electrical host connector.

12. The standardized hot-pluggable transceiving unit of claim 1, wherein the connector receiving the IP flow is an electrical host connector located on a back panel of the housing, the control plane message is received via the electrical host connector, and the at least one modified IP packet is outputted via another connector located on a front panel of the housing.

13. The standardized hot-pluggable transceiving unit of claim 1, wherein the IP flow transports a Serial Digital Interface (SDI) payload comprising a video payload, and the IP flow conforms to one of the following standards: the Society of Motion Picture and Television Engineers (SMPTE) 2022-5 standard, the SMPTE 2022-6 standard, and the SMPTE 2022-7 standard.

14. A standardized hot-pluggable transceiving unit comprising:
   a housing having specific standardized dimensions and adapted to being inserted into a chassis of a hosting unit;
   at least one connector receiving a plurality of IP flows respectively transporting a video payload; and
   a processing unit processing IP packets of at least some of the plurality of IP flows to combine the video payloads of the at least some of the plurality of IP flows into a multi-video image IP flow based on a control plane message, the control plane message being received by one of the following: the at least one connector receiving the plurality of IP flows or another connector of the transceiving unit.

15. A system comprising:
   a hosting unit comprising a chassis adapted for receiving at least one standardized hot-pluggable transceiving unit, the chassis comprising at least one processing unit for processing IP packets of an IP flow; and
   a standardized hot-pluggable transceiving unit comprising:
      a housing having specific standardized dimensions, the housing being inserted into the chassis of the hosting unit;
      a host connector located on a back panel of the housing for exchanging data with the processing unit of the chassis; and
      a processing unit processing at least one IP packet of an IP flow received by the transceiving unit based on a control plane message received by the transceiving unit, the processing comprising modifying the at least one IP packet of the received IP flow based on the control plane message and outputting the at least one modified IP packet, the IP flow and the control plane message being respectively received by one of the following: the host connector or another connector located on a front panel of the housing,
   whereby modifying the at least one IP packet of the received IP flow based on the control pane message comprises at least one of the following: modifying a destination address of the IP packet, modifying a Quality of Service (QoS) parameter of the IP packet, compressing or decompressing the IP packet, encrypting or decrypting the IP packet.

16. The system of claim 15, wherein the at least one modified IP packet is outputted via the host connector to the processing unit of the chassis for further processing.

17. The system of claim 15, wherein the IP flow has been processed by the processing unit of the chassis before transmission via the host connector to the processing unit of the transceiving unit.

18. The system of claim 15, wherein the processing unit of the chassis implements a packet forwarding functionality.

19. The system of claim 15, wherein the processing unit of the transceiving unit further generates one of a report or an alarm related to the IP flow, the generated report or alarm being transmitted by the transceiving unit via one of the following: the host connector or another connector located on the front panel of the housing.

\* \* \* \* \*